Figure 1:
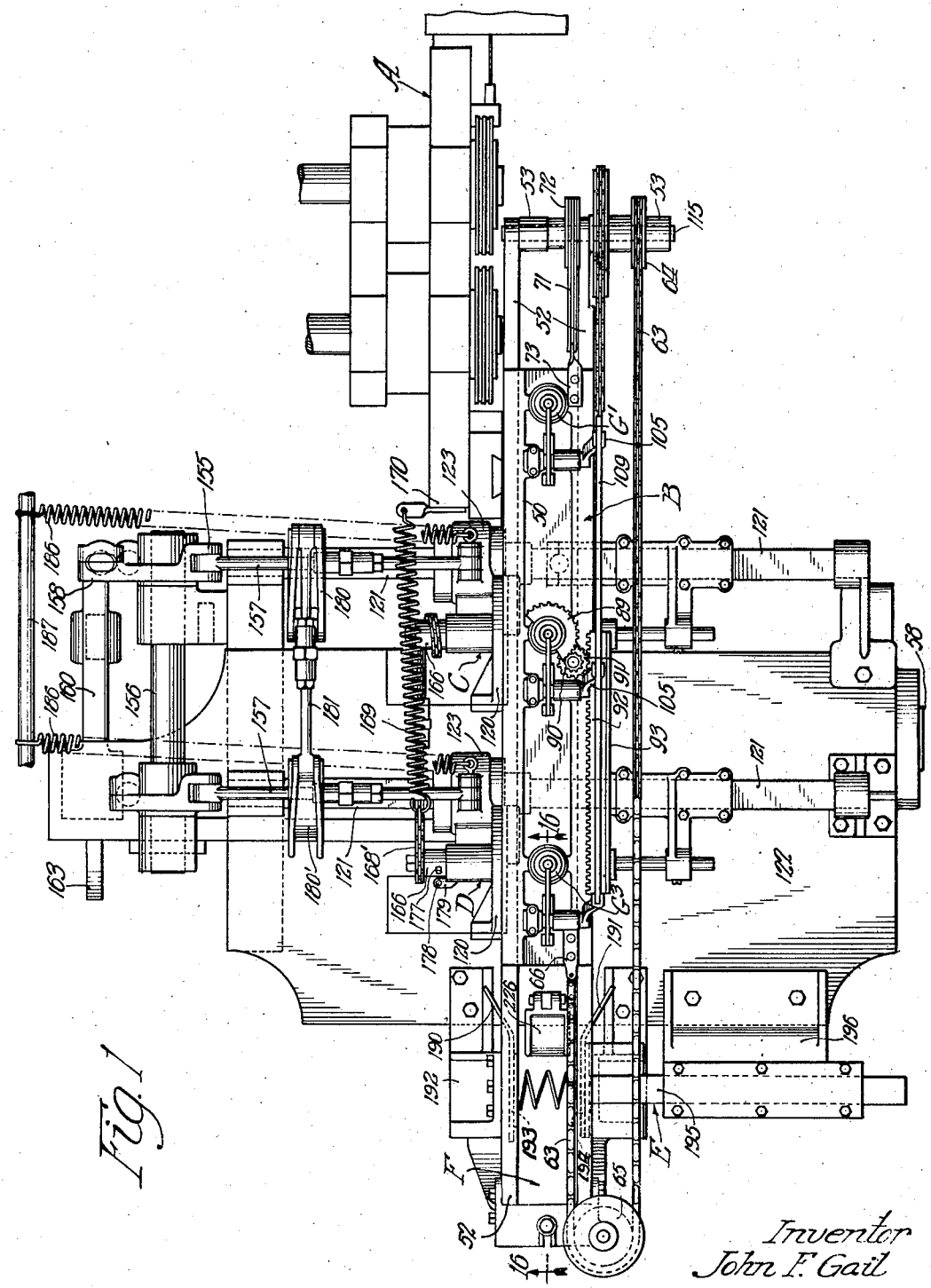

March 29, 1932.  J. F. GAIL  1,851,540
MACHINE FOR MAKING SPIRAL SPRINGS
Filed May 15, 1930   16 Sheets-Sheet 1

Inventor
John F. Gail
By Fisher, Clapp, Soans & Pond. Attys.

March 29, 1932. J. F. GAIL 1,851,540
MACHINE FOR MAKING SPIRAL SPRINGS
Filed May 15, 1930 16 Sheets-Sheet 2

Inventor
John F. Gail
By Fisher, Clapp, Soans & Pond Attys.

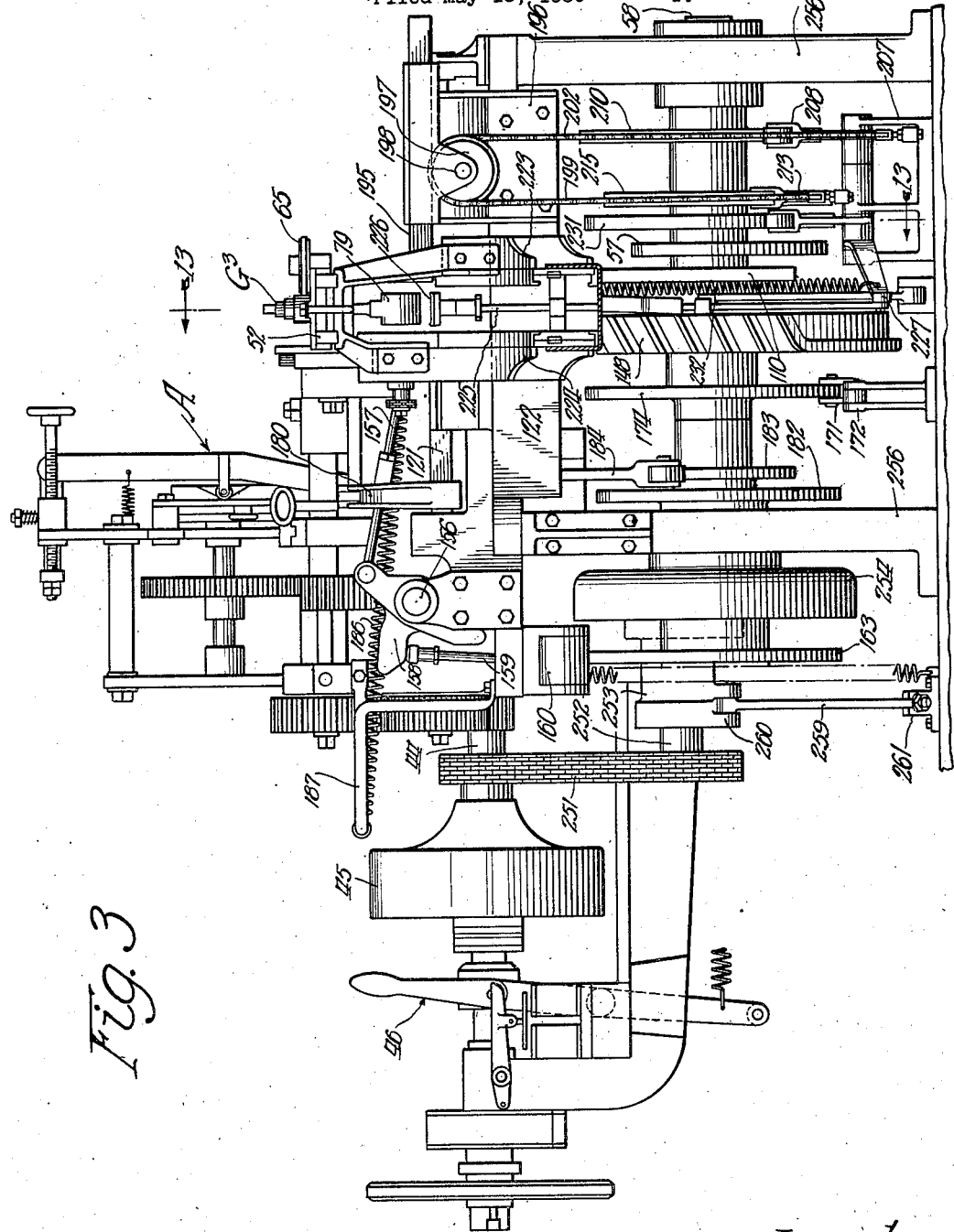

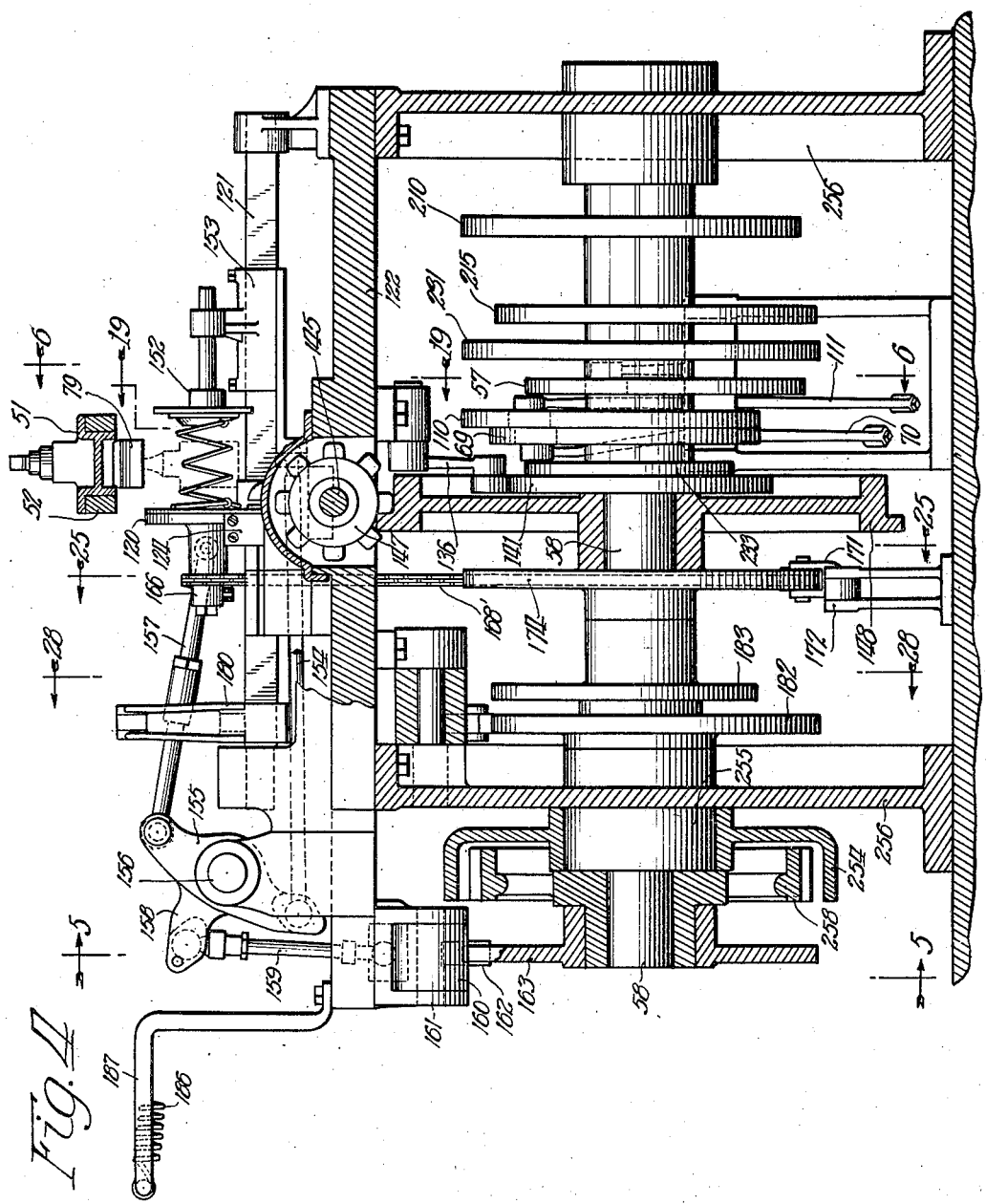

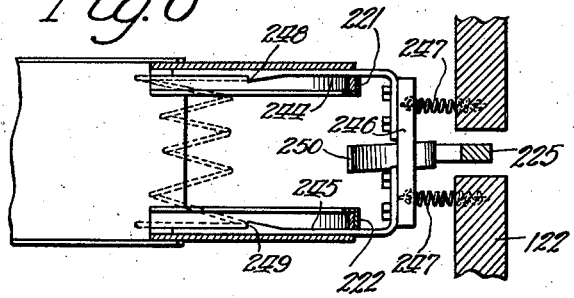
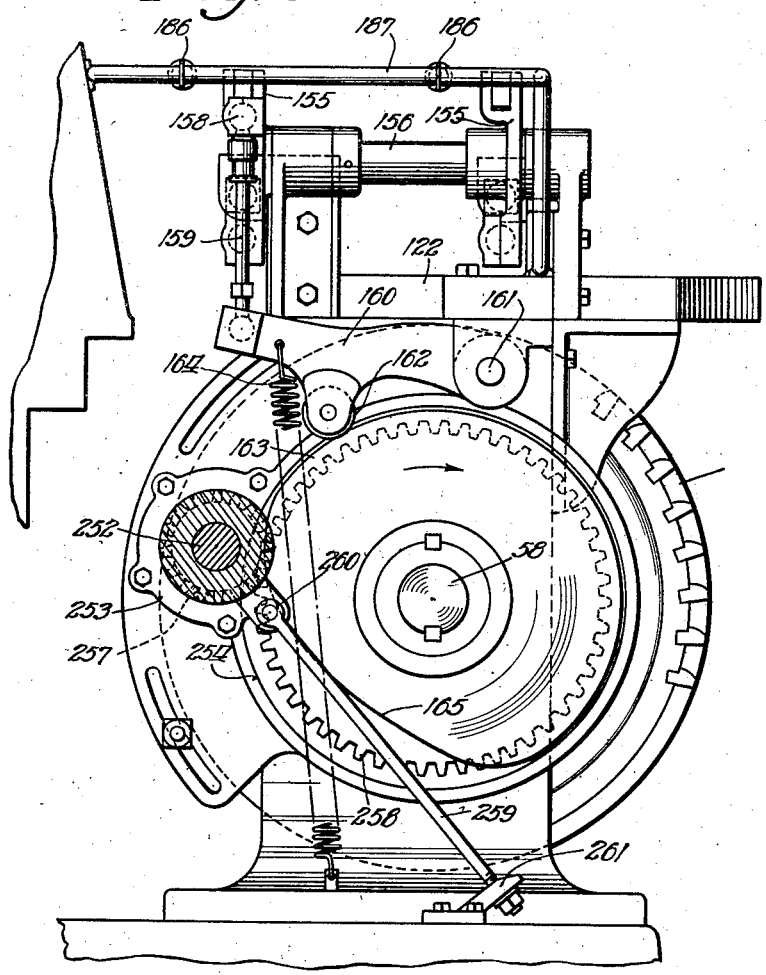

March 29, 1932.  J. F. GAIL  1,851,540
MACHINE FOR MAKING SPIRAL SPRINGS
Filed May 15, 1930  16 Sheets-Sheet 6

Inventor
John F. Gail

March 29, 1932.  J. F. GAIL  1,851,540
MACHINE FOR MAKING SPIRAL SPRINGS
Filed May 15, 1930  16 Sheets-Sheet 7

Inventor
John F. Gail
By Fisher, Clapp, Soans & Pond Attys

March 29, 1932. J. F. GAIL 1,851,540
MACHINE FOR MAKING SPIRAL SPRINGS
Filed May 15, 1930 16 Sheets-Sheet 8
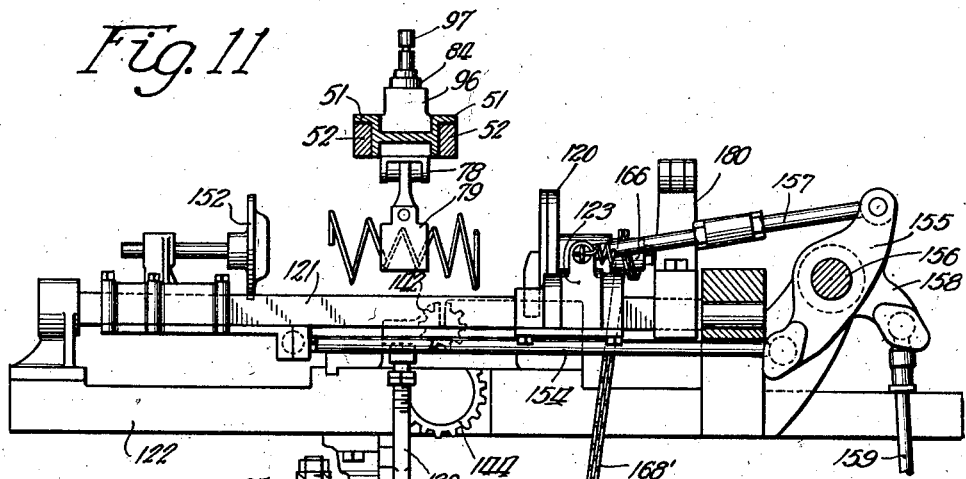
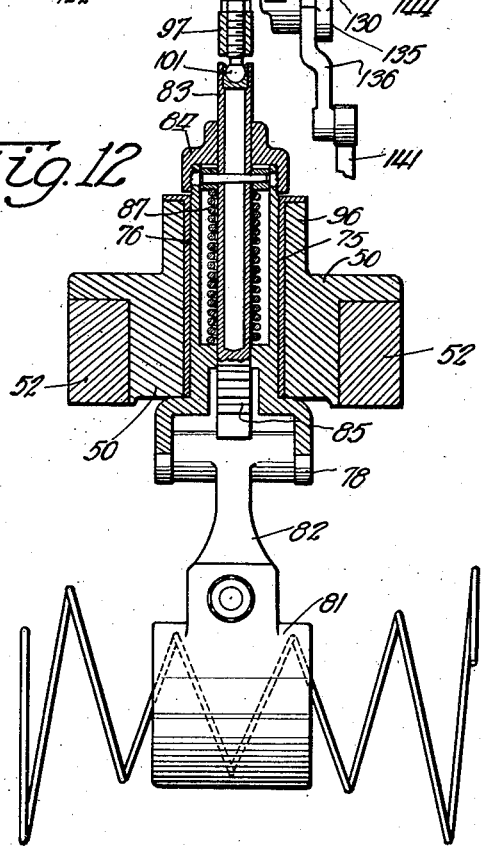
Inventor
John F. Gail March 29, 1932.  J. F. GAIL  1,851,540
MACHINE FOR MAKING SPIRAL SPRINGS
Filed May 15, 1930   16 Sheets-Sheet 9

Inventor
John F. Gail

March 29, 1932. J. F. GAIL 1,851,540
MACHINE FOR MAKING SPIRAL SPRINGS
Filed May 15, 1930 16 Sheets-Sheet 10

Inventor
John F. Gail

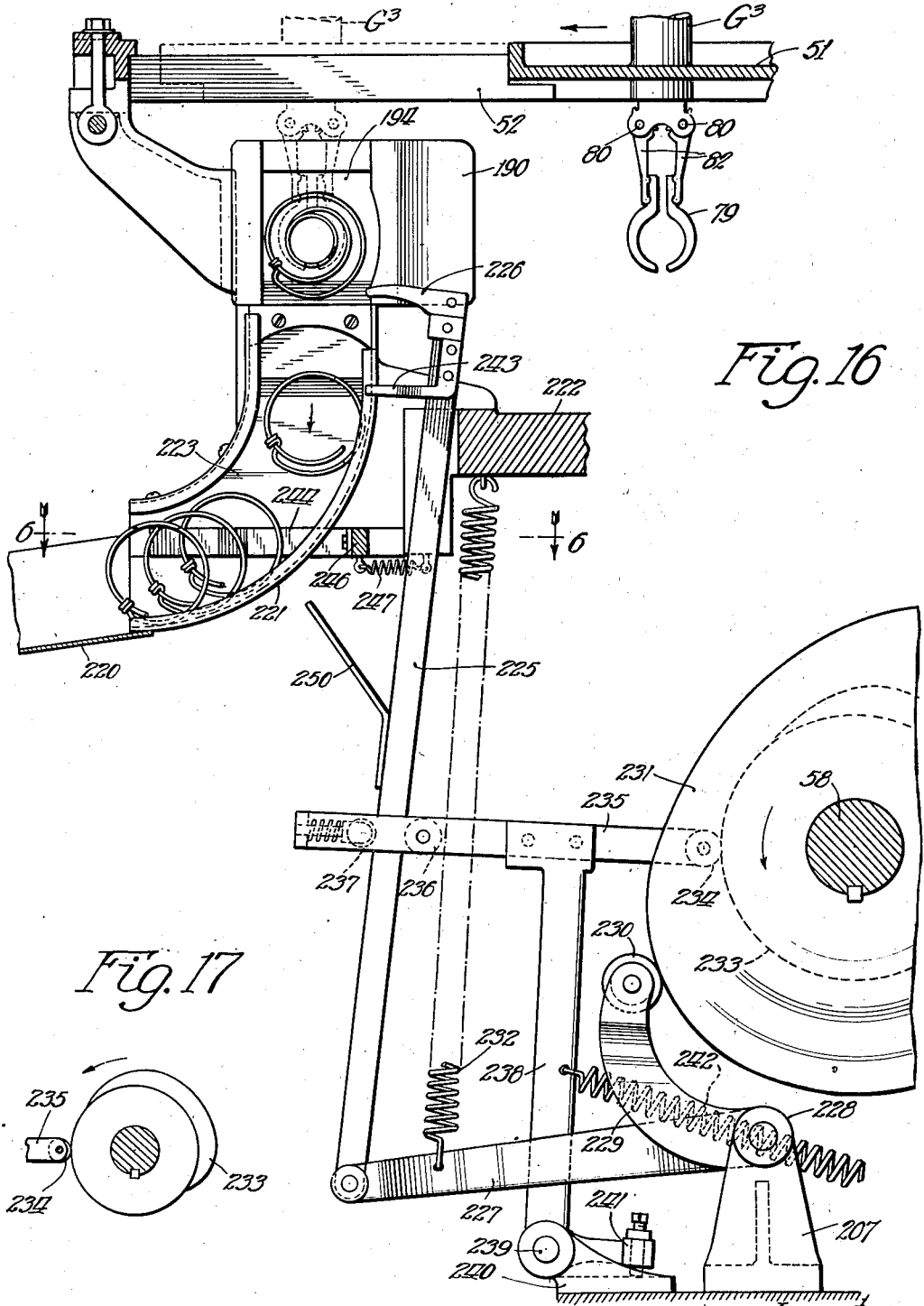

March 29, 1932.  J. F. GAIL  1,851,540
MACHINE FOR MAKING SPIRAL SPRINGS
Filed May 15, 1930  16 Sheets-Sheet 12

Inventor
John F. Gail

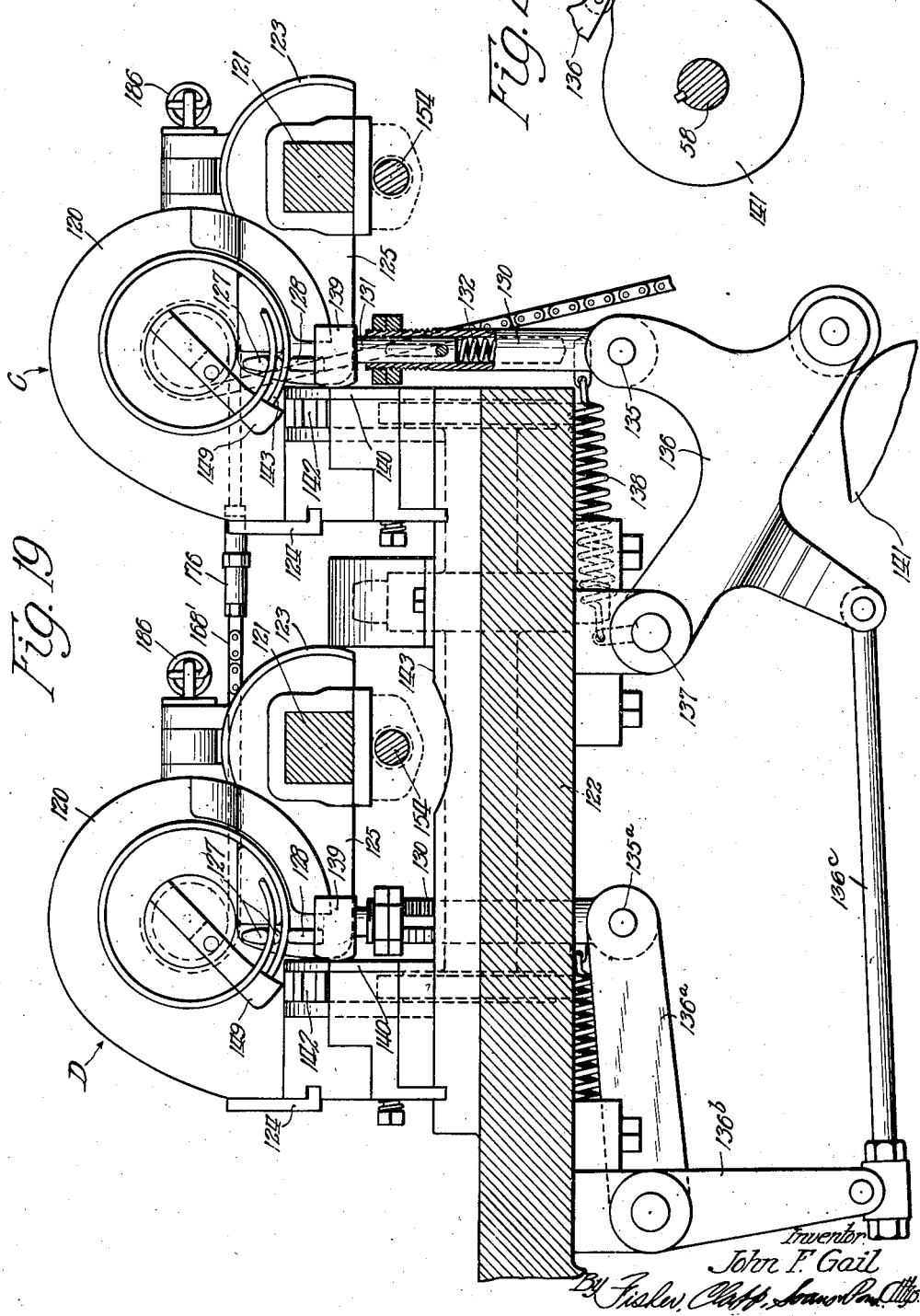

March 29, 1932.  J. F. GAIL  1,851,540
MACHINE FOR MAKING SPIRAL SPRINGS
Filed May 15, 1930  16 Sheets-Sheet 14
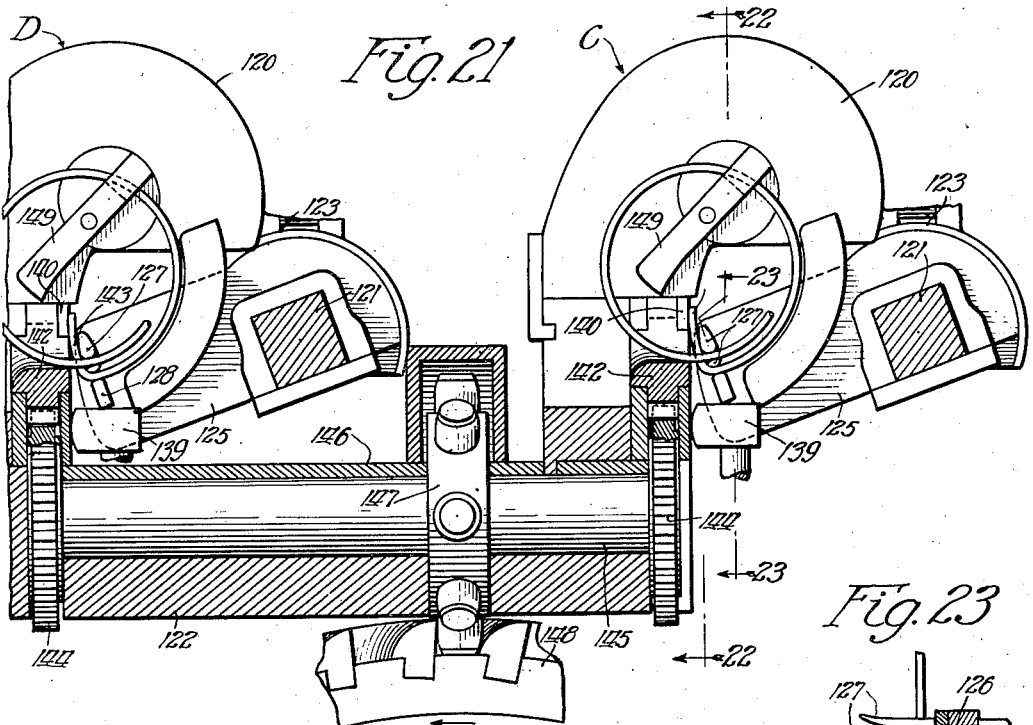
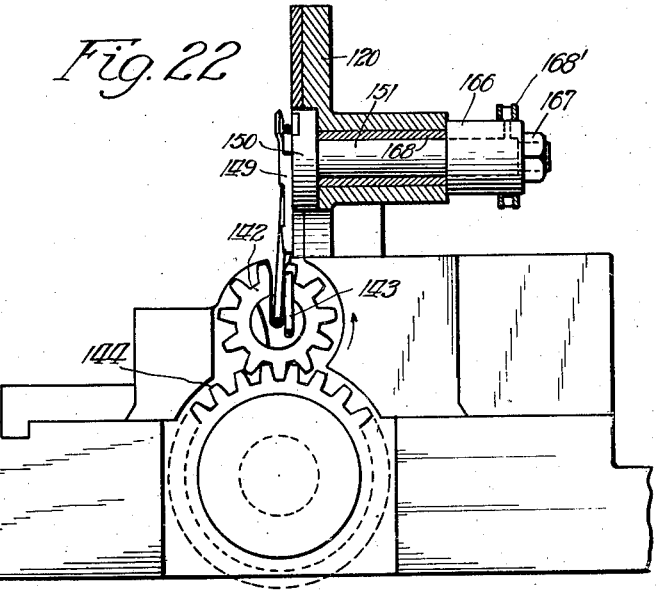
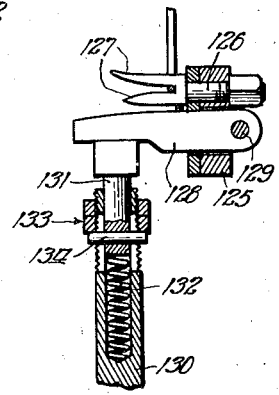
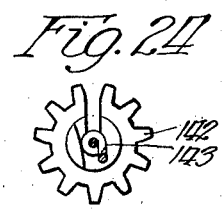
Inventor
John F. Gail
By Fisher, Clapp, Soans & Pond Attys.

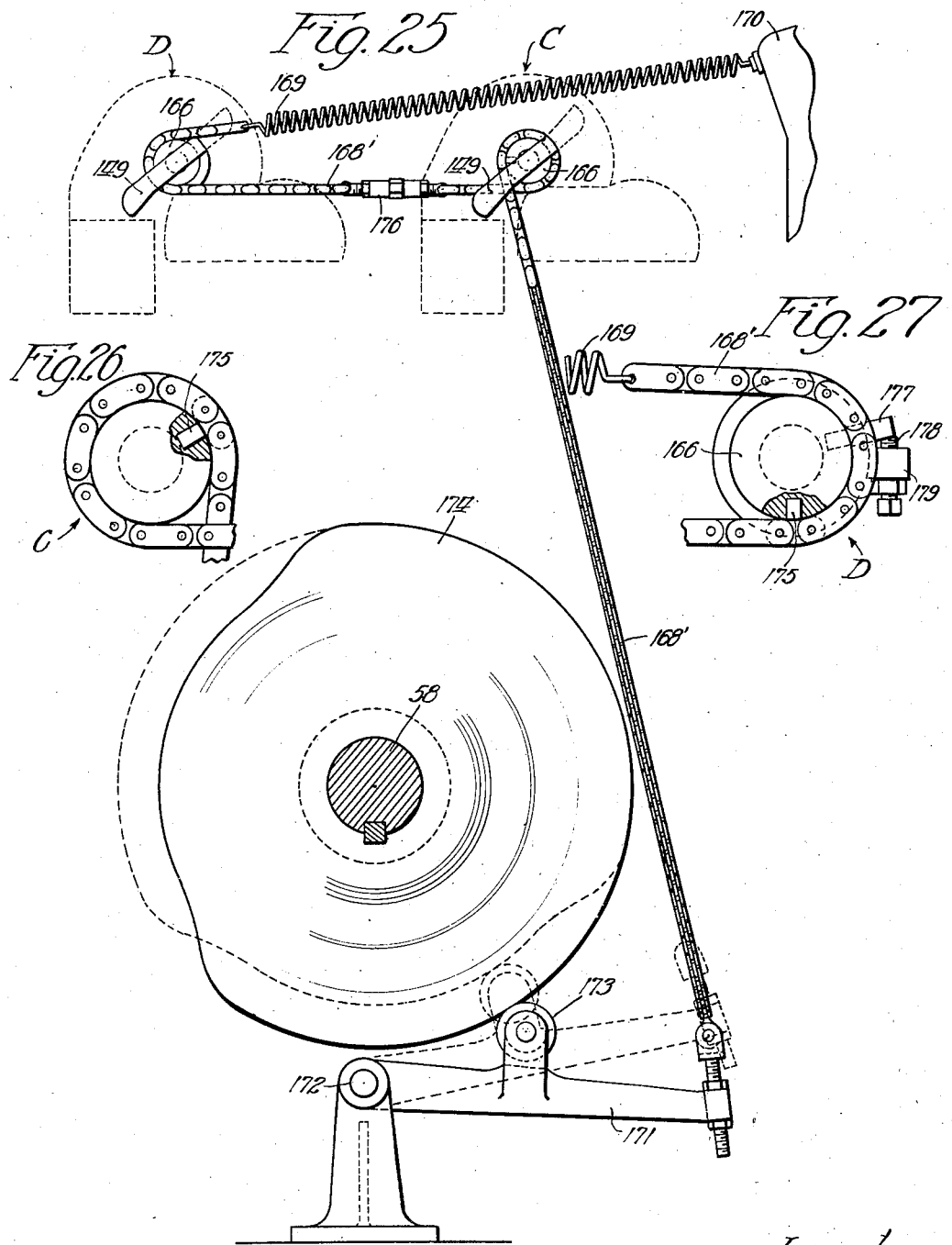

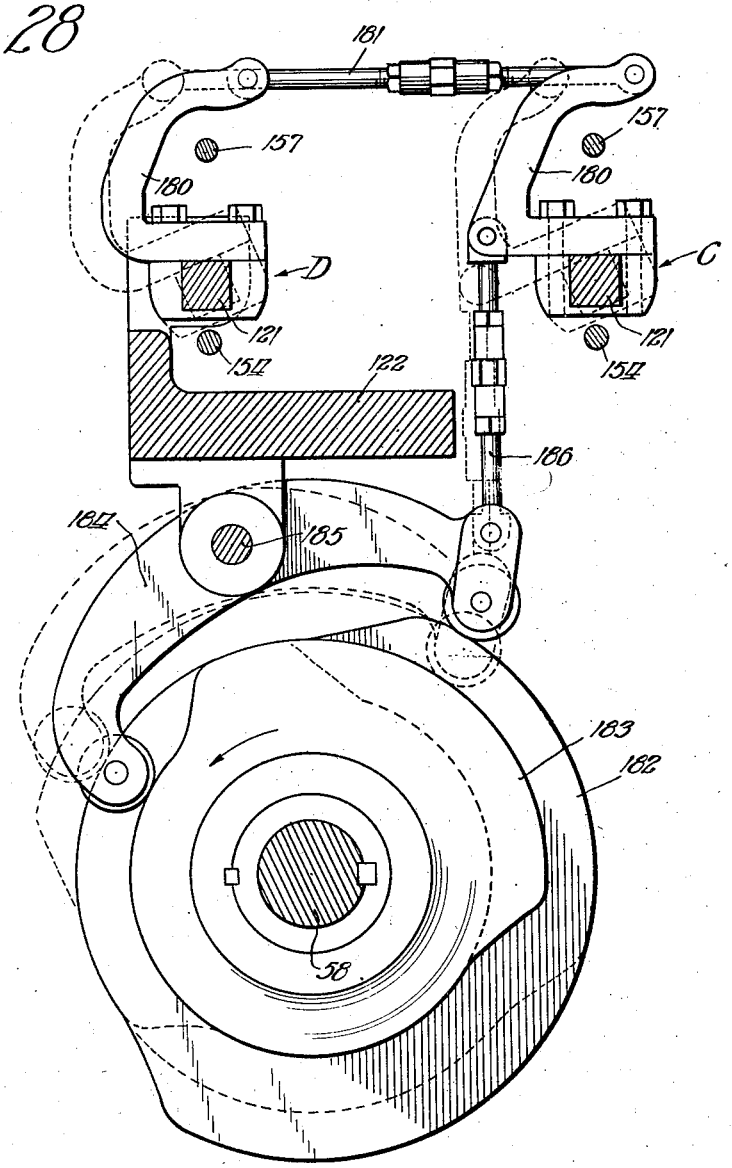

Patented Mar. 29, 1932

1,851,540

UNITED STATES PATENT OFFICE

JOHN F. GAIL, OF EVANSTON, ILLINOIS, ASSIGNOR TO SIMMONS COMPANY, OF NEW YORK, N. Y., A CORPORATION OF DELAWARE

MACHINE FOR MAKING SPIRAL SPRINGS

Application filed May 15, 1930. Serial No. 452,547.

This invention relates to a machine for making spiral springs, and more particularly to a machine for making spiral springs, knotting or tying both ends thereof, sizing the same and finally nesting the same for convenience in handling and storage of large numbers of springs. In some of its aspects, my present invention is in the nature of an improvement upon the machine set forth in my United States Patent No. 1,681,728, issued August 21, 1928.

The main objects of my invention are to provide a machine of the type referred to in which the various operations thereby performed on each spring are performed progressively as the springs are made and conveyed through the machine; to provide an arrangement of mechanism which will lend itself to compactness and simplicity of the structure as a whole; to provide a machine of the type referred to which will be rapid and efficient in operation, durable, and not likely to get out of working order; and in general, it is the object of my invention to provide an improved machine of the class described.

Other objects and advantages of my invention will be understood by reference to the following specification and accompanying drawings in which I have illustrated a machine for making spiral springs, tying or knotting both ends thereof, sizing and nesting the same, the disclosed machine constituting a selected structural embodiment of my invention.

Figure 2:
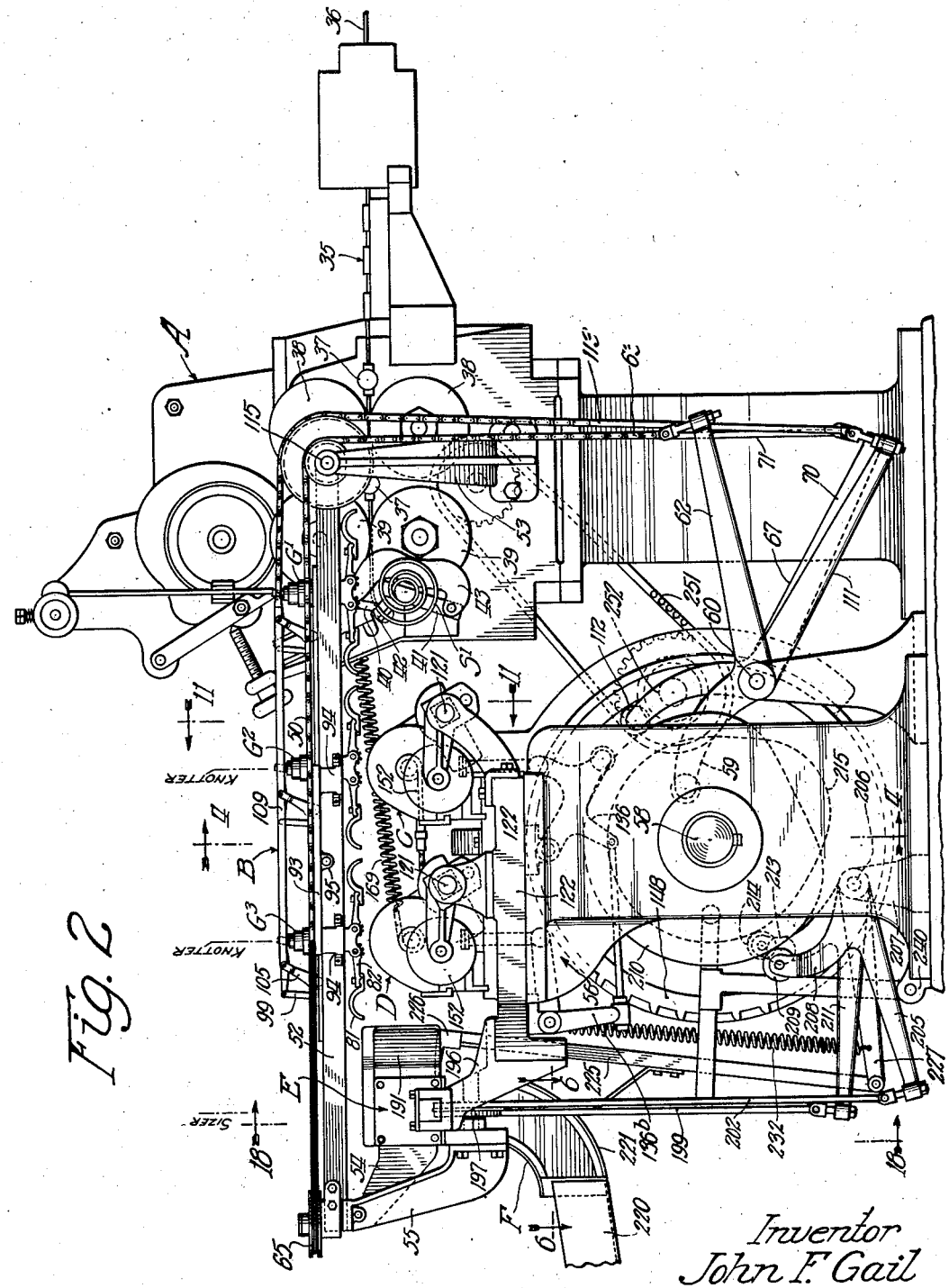
Figure 7:
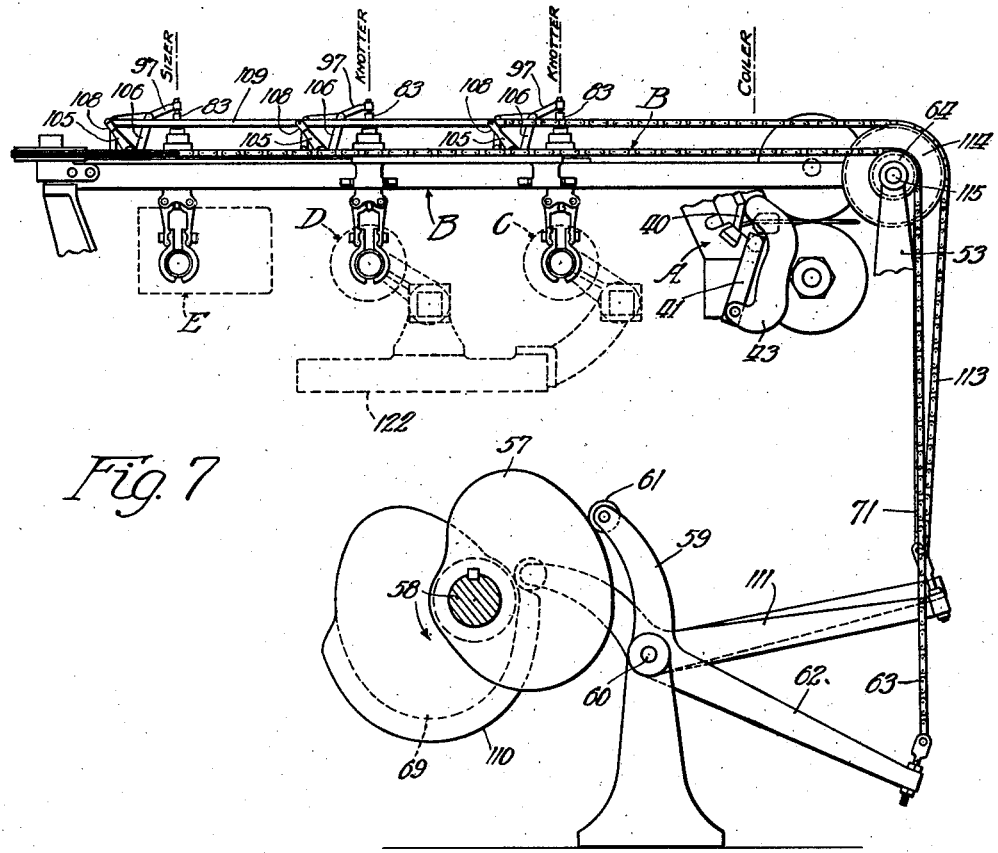
Figure 8:
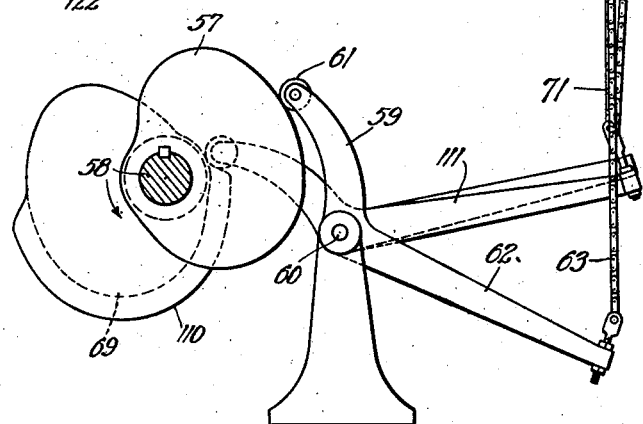
Figure 9:
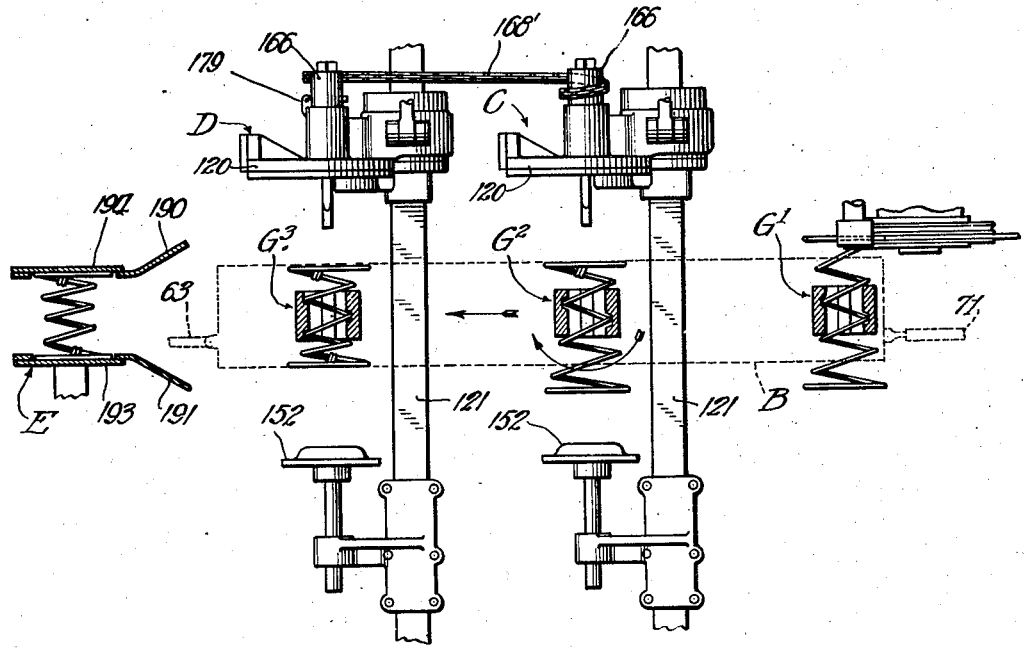
Figure 10:
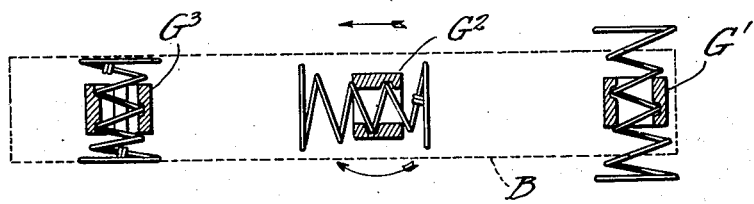
Figure 13:
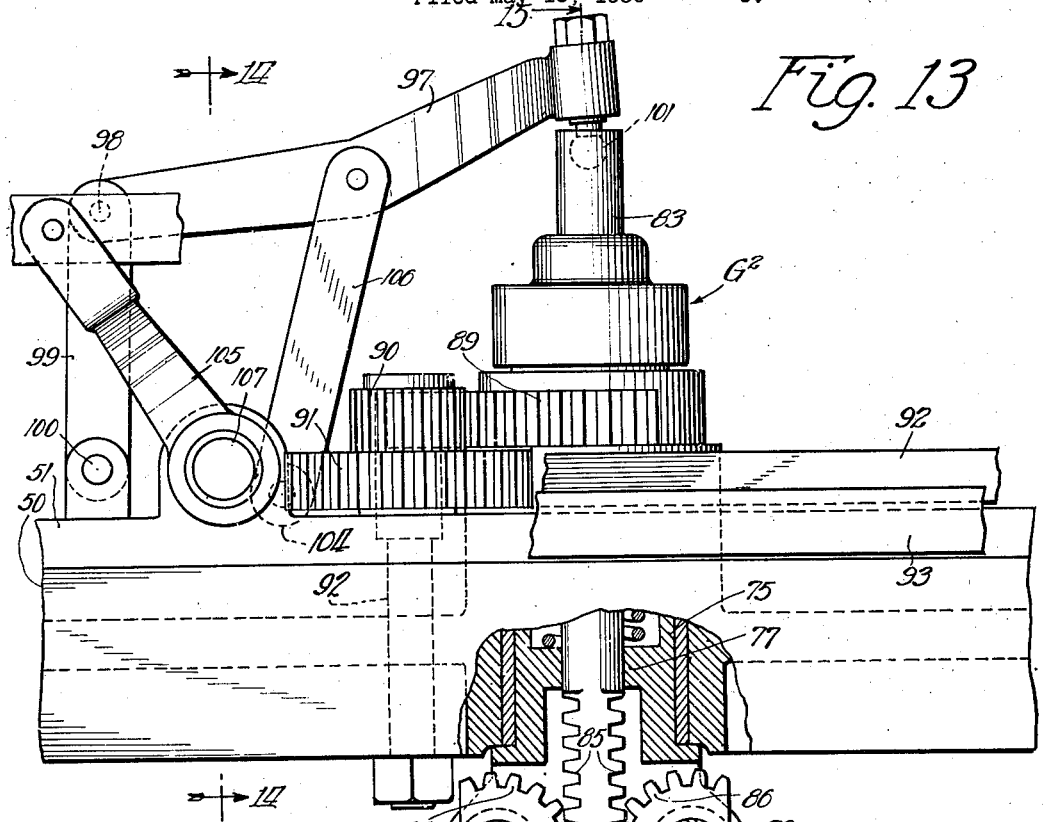
Figure 14:
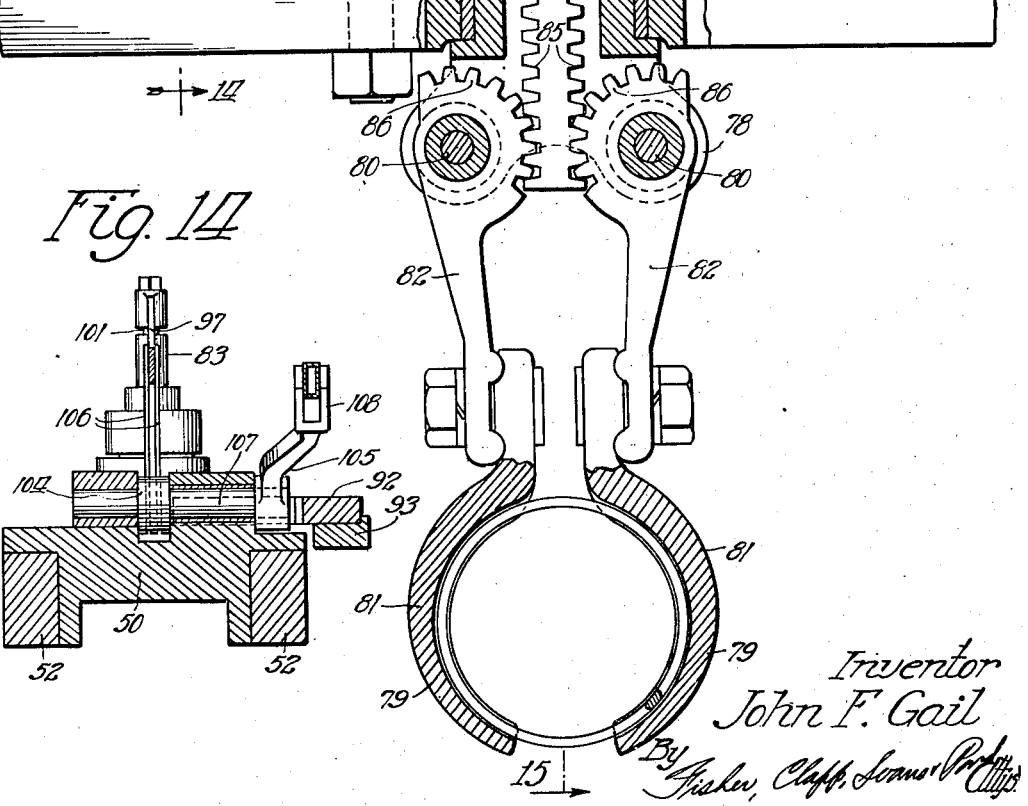
Figure 15:
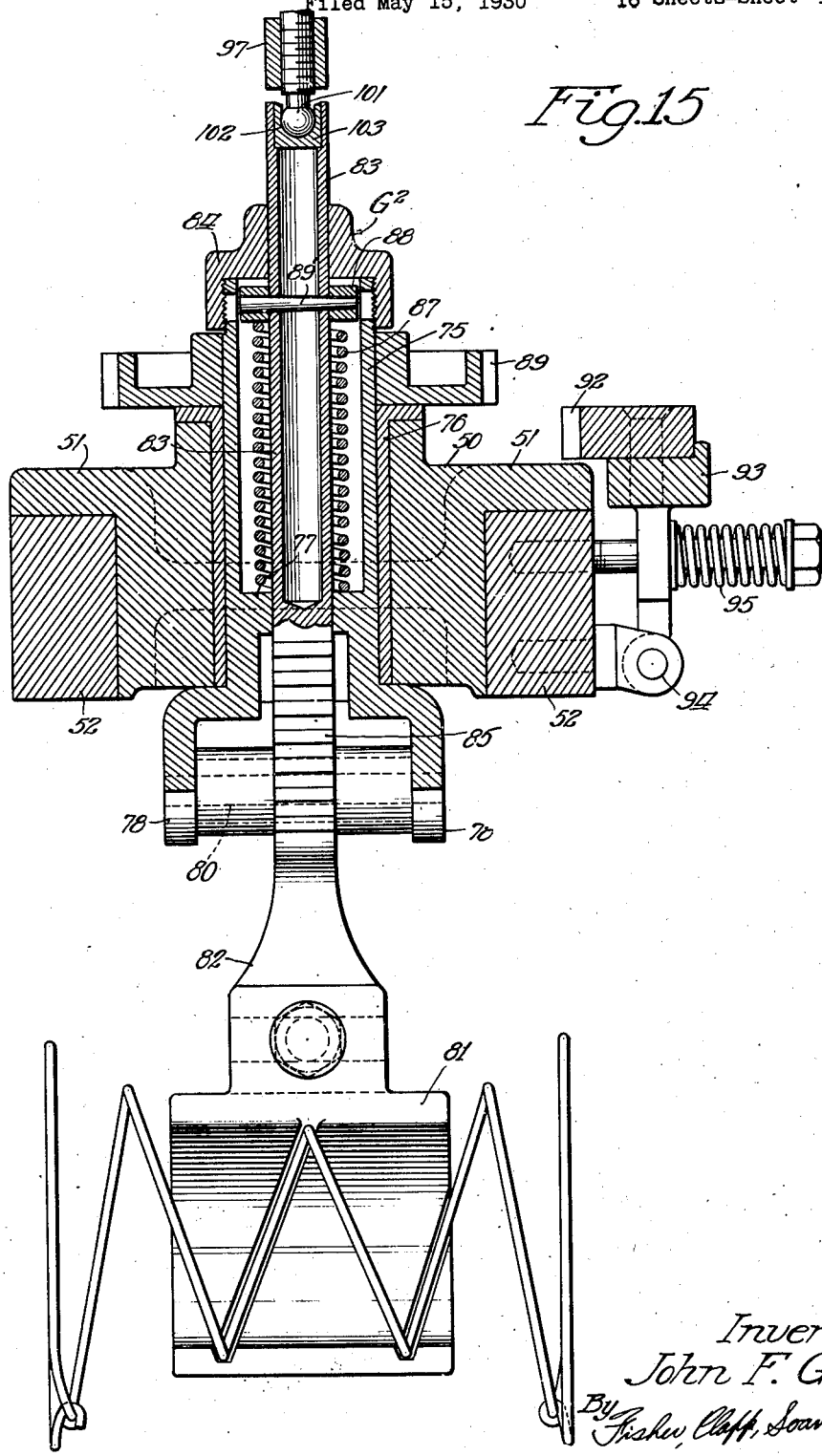
Figure 18:
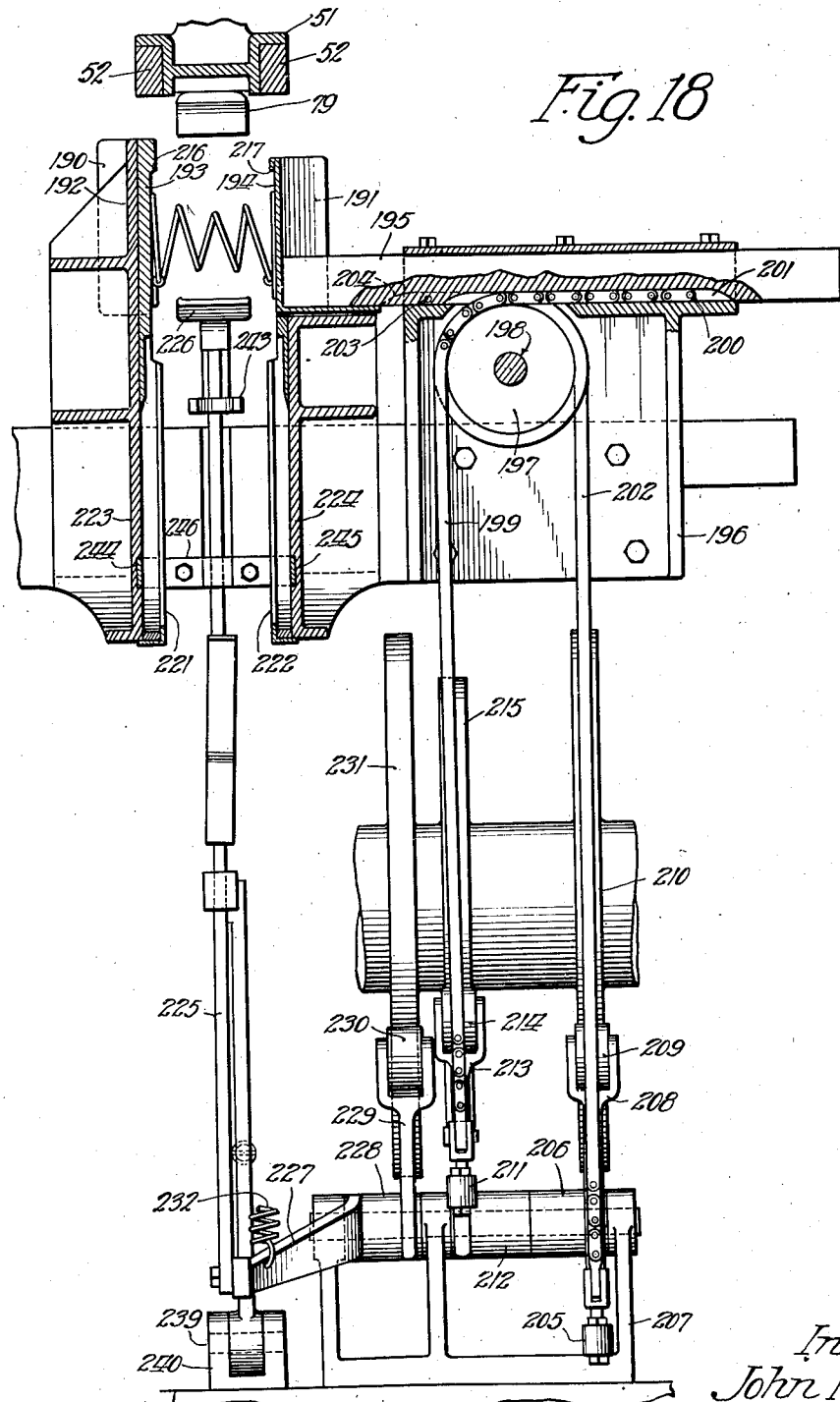

There are 16 sheets of drawings in which
Fig. 1 is a plan.
Fig. 2 is a side elevation.
Fig. 3 is an end elevation of the left hand end of Figs. 1 and 2.
Fig. 4 is a section on the line 4—4 of Fig. 2.
Fig. 5 is a section on the line 5—5 of Fig. 4.
Fig. 6 is a section on the line 6—6 of Figs. 2 and 16.
Fig. 7 is a more or less diagrammatic side elevation illustrating the relative arrangement of the various stages of operation.
Fig. 8 is a detail more clearly illustrating a part of the mechanism shown in Fig. 7.
Fig. 9 is a more or less diagrammatic plan corresponding to Fig. 7.
Fig. 10 is a more or less diagrammatic representation of one stage in the course of travel of a spring through the machine.
Fig. 11 is a fragmentary end elevation as indicated by the line 11—11 of Fig. 2.
Fig. 12 is a vertical sectional view through one of the devices for conveying the springs from one of the operating devices to another.
Fig. 13 is an enlarged elevation of a part of the spring conveying means, certain parts being broken away and illustrated in section to more clearly illustrate the construction thereof.
Fig. 14 is a section on the line 14—14 of Fig. 13.
Fig. 15 is a section on the line 15—15 of Fig. 13.
Fig. 16 is a section on the line 16—16 of Fig. 1.
Fig. 17 is a detail illustration of one of the operating cams shown in part in Fig. 16.
Fig. 18 is a section on the line 18—18 of Fig. 2.
Fig. 19 is a section on the line 19—19 of Fig. 4.
Fig. 20 is a detail illustration of one of the operating cams shown in part in Fig. 19.
Fig. 21 is a section similar to Fig. 19 but showing certain parts in a changed position.
Figs. 22 and 23 are sections on the lines 22—22 and 23—23 respectively of Fig. 21.
Fig. 24 is an illustration similar to a part of Fig. 22 but showing the relative position of certain parts upon completion of a tying or knotting operation.
Fig. 25 is a section on the line 25—25 of Fig. 4, certain parts being omitted to clarify the illustration.
Figs. 26 and 27 are rear views of certain parts shown in Fig. 25, and
Fig. 28 is a section on the line 28—28 of Fig. 4.

General description

Referring now to the drawings and more particularly to Figs. 1 and 2, my improved machine includes a wire coiling mechanism indicated generally at A, this mechanism being preferably of the type disclosed in my aforesaid patent. Briefly described, the wire coiling mechanism includes wire straightening rolls or the like indicated at 35 through which spring wire 36 passes to be straightened. The wire 36 is guided by suitable guides 37 through cooperating upper and lower feed roll pairs 38 and 39 respectively which are actuated to intermittently advance the wire to form the springs. The wire is directed against a coiling block 40 which bends the wire into coil form and a pitch block 41 is provided for controlling the spacing or pitch of the coils. A cut-off device indicated at 42 is provided for severing the completed spiral spring from the wire supply during the intervals in which the feed rolls 38 and 39 are made inoperative to advance the wire.

The coiling mechanism thus far described is in all material respects the same as that shown in my said prior patent and the operating mechanism may also be the same. Hence, further detailed description of the coiling mechanism is deemed unnecessary in this description. However, I have added to the coiling mechanism of my prior patent, a shield indicated at 43 for preventing accidental entanglement of the last formed portion of each coil spring with the adjacent mechanism of the coiling machine or with the adjacent portion of the wire stock which is being directed against the coiler block. This shield 43 may conveniently be mounted on the pitch block 41 as clearly shown in Fig. 4.

The coiling mechanism may be driven from a main power shaft 44 to which power is transmitted by a belt driven pulley 45 and suitable clutch mechanism indicated at 46 (see Fig. 3).

A coil spring formed by the coil mechanism A is indicated at S1, this reference character also denoting the first position of a spring in my improved machine. Conveying mechanism indicated generally at B is provided for carrying the springs formed by the coiling mechanism to the other mechanisms. The knotting mechanism in the present instance includes a pair of knotting devices indicated at C and D respectively, these devices being respectively operable to tie or knot the opposite ends of the springs formed by the coiling mechanism. Upon completion of the second knotting operation, the springs are conveyed from the second knotter D to a sizing mechanism E which is located at the entrance to a spring receptacle F in which the completed and sized springs are nested so that large quantities of the springs occupy a minimum of space and may be conveniently handled and stored for future use.

*The conveying mechanism*

The conveying mechanism B includes an elongated carriage or rider 50 which in cross-section is more or less I-shaped as clearly indicated in Fig. 15 and provided with outwardly extending flanges 51—51 on its opposite sides whereby the carriage is slidably mounted on a pair of supporting rails or bars 52—52. The supporting rails 52—52 are mounted at one end on bracket 53 which is supported by the frame of the coiling mechanism A. The opposite ends of the rails 52—52 are supported by means of brackets such as indicated at 54 and 55, the latter being mounted on conveniently accessible stationary parts of the main frame work of the knotting and sizing mechanism. The said main frame work is designated by the reference character 56. The carriage 50 is slidable longitudinally along the rails 52—52 and cam actuated means is provided for effecting reciprocation of the carriage along the said rails. This actuating means includes a cam 57 which is keyed to a main power shaft 58. The main power shaft 58 extends transversely of the knotting mechanism and is mounted in suitable bearings provided in the supporting frame work of the machine as best shown in Figs. 3 and 4. The cam 57 acts on the free end of a bell crank arm 59 to rock the bell crank about its pivot 60, the said free end of the arm being provided with an anti-friction roller 61. The other arm of the bell crank is indicated at 62 and has its free end connected by means of a chain 63 to the left hand end of the carriage. The chain 63 is adjustably connected to the free end of the bell crank arm 62 by any suitable means such as indicated in Fig. 7 and it extends upwardly to a roller 64 over which it passes as clearly shown in Figs. 2 and 7. At the left hand end of the machine, the chain 63 passes around a roller 65 as clearly shown in Fig. 1. The adjacent end of the chain is connected to the left hand end of the carriage by means of an attaching bracket 66 or the like. When the carriage 50 is in its right hand position as shown in Figs. 1 and 2, the bell crank arm 62 is in an up-position as shown in Fig. 2. The cam 57 is then operative to effect downward movement of the arm 62 and consequent movement of the carriage towards the left hand end of the mechanism.

Similar mechanism is provided for moving the carriage towards the right and this mechanism includes a bell crank 67 which is pivotally mounted on the pivot rod 60. One arm 68 of the bell crank 67 is adapted to be actuated by a cam 69 and the other arm 70 of the bell crank is connected by means of a chain 71 to the right hand end of the carriage. The chain 71 extends upwardly from the outer end of the bell crank arm 70 and over a pulley 72 and is connected to the right hand end of the carriage by means of a connecting bracket or the like indicated at 73 (see Fig. 1). When the carriage is in its left hand position as represented in Fig. 7, the bell crank 67 is substantially in the position as indicated in Figs. 7 and 8 and the cam 69 is then operative to swing the bell crank so as to cause the outer end of the arm 70 thereof to move downwardly, thereby pulling the carriage to the right. The cams 57 and 69 are, of course, arranged in properly synchronized relation to effect reciprocation of the carriage in proper relation to the operation of the spring coiling, knotting and sizing devices.

The carriage 50 is provided with three spring gripping units in this instance, one of which is indicated at G1, a second at G2 and a third at G3. The gripper G1 serves to convey springs from the coil mechanism to the first knotter C, the gripper G2 for conveying springs from the first knotter C to the second knotter D and the gripper G3 for conveying springs from the second knotter D to the sizing mechanism E. The respective gripping devices are substantially the same construction except that the second gripper G2 is arranged to rotate 180 degrees during its travel from the first knotter to the second knotter so as to reverse the spring carried thereby, whereby the end left unknotted by the knotter C is presented to the knotter D, it being observed that both knotters are arranged in line on the same side of the path of travel of the spring.

The spring grippers

Describing first the gripper G2, reference is directed particularly to Figs. 1, 13 and 14. By reference to the said figures, it will be seen that the gripper G2 includes a sleeve-like member 75 which extends through and is rotatably mounted in the carriage 50, a suitable apertured boss being provided therein for receiving the sleeve. A bushing 76 may be provided for eliminating wear and insuring smooth operation of the mechanism. The sleeve 75 is provided with an internal or inwardly extending flange 77 adjacent its lower end and the lower end of the sleeve outwardly of the carriage 50 is bifurcated so as to form ears 78—78. As seen in Fig. 13, the ears 78—78 serve to pivotally receive a pair of spring gripping jaws 79—79, these jaws being pivotally mounted between the opposite ears by means of pivot pins 80—80 whereby the jaws are adapted to be pivotally moved towards and away from each other.

The jaws 79—79 may be of one-piece construction but I prefer to provide two-piece structures which include arcuate jaw parts proper 81—81 and arm parts 82—82, the latter being pivoted between the opposite ears 78—78 and having the arcuate jaws 81 removably secured thereto; for instance, by means of bolts as clearly shown in Fig. 13. Replacement of the arcuate jaws 81—81 in the event of breakage, wear or other difficulties, including change in spring size to be handled, is readily accomplished.

For effecting pivotal movement of jaws as above explained, an actuating member 83 in the form of a rod is slidably mounted in a bearing opening provided in the flange 77 adjacent the lower end of the sleeve 75, the upper end of the actuating member being slidably mounted in a suitable bearing opening provided in a cap member 84 which is mounted on the upper end of the sleeve by means of screw threaded engagement as clearly shown in Fig. 15. The lower end of the actuating member 83 is provided with oppositely facing sets of gear teeth as indicated at 85—85 which constitute racks adapted to engage with gear segments 86—86 formed integral with the jaw arms 82—82. It will be seen that by reciprocation of the actuating member 83, the jaws will be caused to close and open. A spring 87 is disposed around the actuating member 83 inside of the sleeve 75 and intermediate the internal flange 77 and a collar 88 which is secured to the actuating member by suitable means such as a taper pin 89'. In order to permit insertion and removal of the taper pin 89', the sleeve 75 may be provided with oppositely disposed openings as clearly shown in Fig. 15. The spring 87 normally tends to move the actuating member 83 upwardly and thereby to swing the gripping jaws into closed position as shown in Figs. 13 and 15. Means for moving the actuating member 83 downwardly to open the jaws will subsequently be described.

For rotating the gripper G2 during its travel from the knotter C to the knotter D, I provide gear mechanism which includes a gear segment 89 keyed or otherwise non-rotatably mounted on the sleeve 75. The gear segment 89 meshes with a pinion 90 which is carried by a gear 91, the latter being rotatably mounted on the carriage 50 by means of a shaft bolt 92. The gear 91 is arranged to mesh with a rack 92 which is mounted on one of the side rails 52. The rack is mounted so as to be longitudinally fixed with respect to the travel of the carriage 50 but so as to be displaceable transversely of the carriage. The means for so mounting the rack 92 includes a mounting bracket 93 which is pivotally mounted adjacent its ends as shown at 94—94 on the side rail 52. Intermediate its ends, a spring device 95 is provided for normally urging the bracket 93 and rack 92 to move inwardly of the carriage 50 into mesh with the gear 91. Under normal conditions, the gear 91 and rack 92 remain in mesh and hence inward movement of the rack under the influence of the spring 95 is limited. In the event that sufficient resistance is offered to prevent rotation of the gripper G2, the spring 95 will permit the rack 92 to be forced outwardly out of mesh with the gear 91, thereby preventing possible breakage or other damage to certain parts of the mechanism.

The grippers G1 and G3 may be of substantially the same construction as above described in connection with the gripper G2, but inasmuch as these grippers need not be rotated, the gear mechanism for effecting such rotation may conveniently be eliminated, thereby somewhat simplifying the structure. The arrangement of the non-rotatable grippers is clearly shown in Fig. 12 where the carriage 50 is provided with an elongated boss 96 to occupy the space taken up by the gear 89 in the rotatable gripper construction. Any suitable means may be availed of for preventing rotary displacement of the grippers G1 and G3, for instance by making the sleeve part 75 a tight fit in the bushing 76, by providing key means, (not shown) or by causing the cap part 84 to act as a clamping nut against the top of the bushing 76 so as to draw the enlarged, bifurcated end of the sleeve into tight engagement with the bottom of the carriage 50.

*The gripper jaw opening and closing mechanism*

The mechanism for effecting operation of the actuating member 83 and gripper jaws 79—79 includes a rock lever 97 which is pivoted at one end as indicated at 98 to the free end of a link 99, the other end of which is pivotally mounted as indicated at 100 on the carriage 50. The free end of the rock arm 97 is provided with a ball headed stud 101 which is adjustably mounted in the enlarged end portion of the rock arm 97 as clearly shown in Figs. 13 and 15. The ball end of the stud 101 engages a socket 102 provided in the upper end of the actuating member 83, the said socket being formed, in this instance, in a suitable hard metal block 103 which is recessed into the actuating member 83 and seated on shoulders provided in the latter as clearly shown in Fig. 15.

The rock arm 97 is connected to the end 104 of a lever 105 by means of a link 106 which is pivotally connected to the said lever end 104 at one end and at its other end to the rock arm 97 intermediate the ends of the latter. The lever 105 is pivoted intermediate its ends as indicated at 107 to the carriage 50 and is provided with a bifurcated end portion 108. As shown in Fig. 14, the arm or lever 105 and lever end portion 104 are, in fact, separate arm members which are secured to a shaft 107, the latter being rotatably mounted on the carriage 50. This construction is, of course, desirable in that it facilitates construction but it will be noted that the effect of this separate arm construction is that of a lever pivoted intermediate its ends as above referred to.

By reference to Figs. 1, 2, and 7, it will be seen that each of the grippers G1, G2 and G3 is provided with the above described actuating lever and arm mechanism. The grippers are all actuated in unison so that the jaws are simultaneously crossed around a spring and simultaneously opened. For this purpose, the bifurcated ends 108 of the lever arms 105 are connected by means of a bar or link 109 which fits between the bifurcations of the respective arms and is pivoted thereto. It will be seen that by moving the bar or link 109 to the right from the position shown in Fig. 7, each of the rock arms 97 will be caused to rock in a clockwise direction about their intermediate pivotal connections with the links 106, thereby depressing the actuating members 83. By reference to Fig. 13, it will be seen that downward movement of the actuating member 83 is effective to open the jaws 79—79.

The link or bar 109 may be moved to the right by means of cam mechanism best illustrated in Fig. 7. This cam mechanism includes a rotating cam 110 carried by the main shaft 58 and a cam actuating rock lever 111 which is pivoted intermediate its ends on the pivot shaft 60. The cam engaging end of the rock lever is provided with an anti-friction roll 112 (Fig. 2) and the opposite end of the rock lever 111 is connected by means of a chain 113 to the right hand end of the bar 109, the said chain extending upwardly and over a pulley or roller 114 which is rotatably mounted on a shaft 115, the latter being supported by the bracket 53.

The cam 110 is designed and synchronized with the other cams of the machine so that the gripper jaws are opened when the carriage is in its extreme left hand position and after the springs carried by the grippers have been delivered to the knotters or sizing device. When the carriage is in its right hand position, the cam and arm mechanism 110—111 operates to close the grippers so as to take hold of the springs preparatory to advancing the springs through the machine. The cam is further designed to permit the chain 113 to travel in unison with the carriage to the right or to the left without effecting movement of the jaw actuating mechanism until the carriage reaches its respective spring receiving and spring delivering positions.

*The spring knotters C and D*

The spring knotters C and D are of substantially identical construction and are also substantially the same as the spring knotting mechanism fully illustrated and described in my said prior Patent No. 1,681,728. Inasmuch as I now make no claim to the knotter construction per se, a detailed description of the same is deemed unnecessary herein, but for facilitating understanding of the present mechanism as a whole, I will proceed to describe the knotting mechanism without reference to details so far as possible without impairing clearness of the description.

Each knotter C and D includes a head 120 which is slidably mounted on a bar 121 and on the bed plate 122 or a bracket or like part secured to the bed plate. For so mounting the head on the bar 121, the head is provided with an offset bracket part 123 which is slidably supported on the bar 121 and tongue member 124 which engages a groove in the said bed plate part as clearly shown in Fig. 19.

For a purpose presently to be set forth, the rod or bar 121 is mounted for oscillation about its own axis and provision is made to permit such oscillation within the bracket part 123 while permitting sliding of the said bracket part lengthwise of the rod 121. A spring positioning and gripping device forming part of each of the knotting devices includes an arm 125 which is longitudinally slidably mounted on the square rod 121 and connected to the bracket part 123 of the knotter head so as to slide in unison therewith. While the arm 125 is slidable along the bar 121, it is also arranged to be rocked with the said bar.

At its outer end, the arm 125 is provided with a bolt 126 having a bifurcated and elongated head part 127 which is designed to receive a part of a spring adjacent the end of the latter substantially in the manner indicated in Figs. 19, 21 and 23. Adjacent the lower edge of the forked head 127, the arm 125 is provided with a lever 128, the latter being pivoted as indicated at 129 to the arm and being adapted to be swung towards or away from the adjacent edge of the forked head 127. This lever 128 is for the purpose of clamping a portion of the spring closely adjacent the end of the latter, against the bottom edge of the forked member 127 to hold the spring so that the latter will move with the arm 125 when the latter is rocked as an incident to oscillation of the bar 121.

The lever 128 is forced upwardly towards the forked member 127 by means of a yieldingly supported, cam actuated plunger which includes a push rod 130, a headed plunger member 131 and a spring 132. The plunger member 131 is slidably mounted in the push rod 130 as clearly shown in Figs. 19 and 23 and the spring 132 normally tends to force the plunger member 131 to move outwardly, the outward limit of movement thereof being adjustable by means of a nut and lock nut indicated as a whole at 133. The push rod member 130 is provided with oppositely disposed, longitudinally extending slots which receive the ends of a cross pin 134 which extends through the shank part of the plunger member 131. The nut and lock nut 133 limits outward movement of the plunger by engaging the ends of the cross pin 134. The push rod member 130 is pivotally mounted at its lower end as indicated at 135 on a rock arm 136 which is pivotally connected as indicated at 137 to the bed plate or other stationary part 122 of the machine. A tension spring 138 stretched between the push rod 130 and a suitably spaced point, for instance the hub of the lever 136, serves to yieldingly maintain the push rod 130 in upright position with the enlarged head portion 139 of the plunger member in frictional engagement with a face plate portion 140 of the knotting mechanism.

The rock arm 136 is actuated by means of a rotary cam 141 which is carried by the main shaft 58. The cam 141 is so designed that it causes the push rod 130 and plunger 131 to move upwardly just before the arm 125 is rocked downwardly from the position shown in Fig. 19 to the position shown in Fig. 21. During such downward movement of the arm 125, the cam 141 permits the arm 136 to swing downwardly to retract the push rod 130 and plunger 131 as necessitated by the downward movement of the arm 125 and engagement of the lever 128 with the top of the plunger head 139. During such downward movement, the spring 132 is effective to force the plunger upwardly with sufficient power to maintain the lever 128 in clamping engagement against the spring in the event that the cam 141 permits the rock arm 136 and plunger 130 to move downwardly with greater rapidity than the arm 125 swings downwardly.

The downward swinging movement of the arm 125 carries the spring downwardly into the bite of a knotting pinion 142, incidently bending the end portion 143 of the spring into substantially the position shown in Fig. 21. The end portion 143 of the spring engages a portion of the face plate 140 and is accordingly bent upwardly around the lower part of the forked member 127 as clearly shown. The knotting pinion 142 is thereafter rotated by means of a gear 144 which is carried by a shaft 145, the latter being rotatably mounted on the bed plate 122 by means of a suitable bearing cap 146. The plunger mechanism 130—131 of the knotter D is actuated simultaneously with the plunger mechanism of the knotter C by means of a bell crank mechanism. The said bell crank mechanism includes an arm 136ª to the outer end of which the plunger is pivoted as shown at 135ª. The bell crank also includes an arm 136ᵇ which is connected by a link 136ᶜ to the rock arm 136 of the knotter C.

By inspection of Figs. 19 and 21, it will be seen that both knotting devices C and D are simultaneously actuated to perform the initial spring-end bending operation and that the knotting pinions 142 are also simultaneously rotated since the driving gears for the knotting pinions are both carried by the shaft 145. The shaft 145 may be rotated in properly synchronized relation to the movement of the other parts by any suitable means which, in this instance, consists of a roll tooth pinion 147 which is adapted to be actuated by means of a multi-tooth worm wheel 148, the latter being mounted on the main shaft 58 for rotation therewith. For each knotting operation, the knotting pinion 142 makes substantially two complete revolutions whereby the bent spring end 143 is wound or wrapped around an adjacent part of the spring as shown in Fig. 24.

It will be apparent that before the initial spring end bending operation may take place, the spring must be arranged so that the end of the spring end coil is located in predetermined relation to the gripping parts 127 and 128, thereby to insure the proper length of spring end 143 to be wrapped around the spring as above described. For positioning the spring in such predetermined relation, I provide a rotatable positioning finger 149, the latter being secured to the head end 150 of a shaft 151 which is mounted in a boss provided on the knotter head 120 (see Figs. 19, 21, 22 and 25). The finger 149 is normally in the position indicated in broken lines in Fig. 25 and is rotated to the position shown in full lines in the said figure. When the springs are presented to the knotters, it is found that the end thereof is almost invariably located somewhere between the desired predetermined position and the position of the forward edge of the finger 149 when in initial position as shown in broken lines in Fig. 25. When the finger 149 is rotated, it will be seen that it will be operative to engage the end of the spring and to thereby rotate the spring sufficiently to bring the end thereof to the said predetermined position.

The knotting mechanism thus far described is substantially the same as that disclosed in my above mentioned prior patent. I will now proceed to describe the means provided in the present instance for actuating both knotting mechanisms simultaneously whereby one spring has its first end knotted while another spring is having its second end knotted at the same time. When the spring conveying mechanism is in its extreme left hand or delivery position, the knotting devices C and D are moved towards the adjacent ends of the springs so as to engage the adjacent ends thereof and cooperating spring positioning or centering devices indicated at 152 are simultaneously moved towards the opposite ends of the respective springs to engage the same, the springs being thereby compressed slightly between the respective centering devices 152 and knotter head members 120. Each of the centering devices 152 are carried by a saddle 153 which is slidably mounted on the square bar 121. The saddle 153 is connected by means of a link rod 154 to one end of an arm 155 which is mounted on a shaft 156 carried by suitable brackets secured to the frame of the machine. The connecting link 154 may be connected at its opposite ends to the respective parts by means of ball and socket joints such as indicated in Figs. 4 and 11 or in any other suitable manner. The opposite end of the arm or lever 155 is connected by means of an adjustable link 157 to the knotter head 120.

It will be seen that when the lever 155 is rocked with the shaft 156, the spring centering device 152 and the knotter head 120 will be simultaneously moved in opposite directions towards or away from each other. It is, of course, understood that there is a spring centering device 152 for each of the knotters C and D, this being clearly shown in Figs. 1 and 9.

For effecting simultaneous movement of the knotter head and centering device as above explained, I provide one of the levers 155 with a bell crank arm 158 to which an adjustable connecting link or rod 159 is pivotally connected at its upper end as shown in Fig. 5.

The lower end of the connecting rod 159 is pivotally connected to the free end of a cam actuated lever 160, the latter being pivoted at one end as indicated at 161 to the bed plate 122 or other conveniently accessible stationary part of the machine. Intermediate its ends, the lever 160 is provided with an anti-friction roller 162 which engages the periphery of a rotating cam 163, the latter being mounted on the main shaft 58 for rotation therewith. A coiled tension spring 164 stretched between the cam lever 160 and the base part or other suitable fixed part of the machine serves to yieldingly pull the cam lever downwardly so as to maintain its roller 162 in operative engagement with the cam 163. Coiled tension springs such as shown at 186, stretched between the respective knotter heads 120 and a stationary bar 187 serve to assist the spring 164 to retract the knotter heads and spring centering devices. It will be seen that during the rotation of the cam 163, the roller 162 traverses the relatively flattened peripheral portion 165 of the cam, whereby the outer end of the lever 160 is caused to reciprocate vertically, thereby imparting rocking movement to the arm 158, the shaft 156 and the rock arms 155.

When the springs have been centered and slightly compressed between the knotter heads 120 and cooperating centering devices 152, the positioning finger 149 is rotated through an arc of approximately 180 degrees to position the end of the spring as above described preparatory to initial bending of the spring end. Rotation of the positioning fingers 149 of each knotter is effected by the following described mechanism. By reference to Fig. 22, it will be seen that the stub shafts 151 which carry the respective positioning fingers 149, are provided with collars 166, these collars being secured to the respective shafts to rotate therewith. In the present instance, I prefer to secure these collars in place so as to permit rotary adjustment thereof relative to the respective shafts 151. This may be accomplished by means of a nut 167 which fits a suitably threaded stem portion provided on the end of the shaft 151, the nut serving to force the collar 166 endwise against a bushing 168, the latter having its other end in engagement with the head portion 150 of the shaft 151. A reciprocated end mechanism may conveniently be used for effecting rotation of the respective shafts 151.

In the present instance, the chain mechanism includes a chain 168' which is connected at one end to a coiled tension spring 169, the latter being anchored at one end to a conveniently located, fixed part of the machine; for instance, a part 170 of the frame of the spring coil mechanism A. The chain 168' passes around the collar 166 of the knotting device D and then horizontally to the knotting device C where the chain is passed upwardly around the collar 166 and downwardly therefrom. At its lower end, the chain 168' is adjustably connected to the free end of a rock arm 171 which is pivotally mounted as indicated at 172 on a suitable bracket provided for that purpose. Intermediate its ends, the rock arm or lever 171 is provided with an anti-friction roller 173 which engages the periphery of a rotating cam 174 carried by the main shaft 58. The cam 174 is shaped so as to impart the desired up and down movement to the rock arm 171 and to thereby effect reciprocation of the chain 168'. Of course, it will be observed that the cam is operative to effect movement of the chain in one direction while the spring 169 serves to effect movement of the chain in the opposite direction.

The chain 168' may conveniently be connected to the respective collars 166 by providing one link of the chain with a stud such as indicated at 175 in Figs. 26 and 27, which stud fits in a socket provided in the respective collars for receiving such stud. An adjustable connector 176 is desirably provided in the length of the chain 168' intermediate the two knotting devices C and D so as to permit adjustment of the position of the finger 149 of one knotting device relative to the position of the finger of the other knotting device. For definitely limiting the forward movement of the fingers 149, one or both of the knotting devices D and C may be provided with an adjustable stop arrangement.

In the present instance, I have shown such a stop arrangement associated with a knotting device D (see Figs. 1 and 27). The knotting device herein disclosed includes a stop pin 177 which is carried by a collar 166 of the knotting device D. The pin 177 projects laterally from the collar 166 and is adapted to engage an adjustable stop member 178 which is in the form of a bolt which threadedly engages an aperture provided in a lug 179 projecting from the rearwardly extending boss part of the knotter head 120. Slight adjustments made in the setting of this adjustable stop need not always be accompanied by adjustment in the length of the actuating chain 168' since the same is flexible and under practical conditions sags slightly. In case the adjustable stop arrangement is reset so as to shorten the actual arc of travel of the fingers 149, the slack or sag in the chain 168' may be correspondingly lessened, thereby permitting the full movement of the cam lever 171 under the action of the cam 174.

Upon completion of the spring positioning operation by rotation of the fingers 149 of the respective knotters, the respective arms 125 and rods 121 are caused to rock to effect the initial end bending operation previously described. Simultaneous rocking movement of the rods 121 and parts carried thereby is effected by mechanism best shown in Figs. 1, 4 and 28. This mechanism includes bent arms 180—180 which are clamped on the respective square rods 121 in any suitable manner; for instance, as shown in Fig. 28. The arms 180 are bent in the usual manner shown so as to extend around the respective connecting rods 157 and so as to position the path of travel of the ends of the arms directly above the respective rods 121 and so that the movement of the ends of the arms is approximately equally divided on opposite sides of the axes of the respective rods 121. The upper or free ends of the bent arms 180—180 are connected by means of an adjustable link 181. It will be observed that rocking movement imparting to either of the arms 180 or rods 121 will be imparted to the other by reason of the connection just described.

Rocking movement is imparted to the rod 121 of the knotting device C by duplex cam mechanism best shown in Fig. 28. This mechanism includes a pair of cams 182 and 183 which are carried by the main shaft 58 and rotated therewith. The cams 182 and 183 are respectively adapted to act on the opposite ends of a rock lever 184 which is pivotally mounted intermediate its ends as shown at 185 on a bracket carried by the bed plate 122 or other stationary part of the machine. The opposite ends of the rock lever 184 are provided with anti-friction rolls for engaging the respective cams and one end of the lever is connected by means of an adjustable link 186 to one of the arms 180. The cams 182 and 183 are so designed that the respective ends of the cam lever 184 are forced upwardly in properly timed relation, one cam being recessed so as to permit lowering of the corresponding end of the lever when the other cam causes upward movement of the other end of the lever. Thus, it will be seen that positive rocking movement of the respective rods 121 is effected. Upon completion of the downward rocking movement of the respective knotter rods 121—121 and parts carried thereby, the knotting pinion 142 of each knotter is actuated by the mechanism previously described. Upon completion of the knotting operation, the respective rods 121—121 are rocked in the opposite direction to move the spring out of the bite of the respective knotting pinions, after which the spring conveying mechanism is again operated to advance the springs in the manner previously explained.

The sizing mechanism

The sizing mechanism E consists generally of means for compressing the springs to a predetermined extent so that upon being released, the springs will expand to an approximately uniform overall length, or at least to a length within certain predetermined limits of variants. The sizing mechanism is best shown in Figs. 1 and 18. By referring to the said figures it will be seen that the sizing mechanism includes a receiving mouth portion formed by the converging side plates 190 and 191, the plate 190 being carried by a bracket 192 which is mounted on the bed plate or any other suitable stationary part of the machine. The side member 190 extends longitudinally of the machine as shown in Fig. 1 so as to form a stationary spring seat 193.

The other side member 191 extends longitudinally of the machine to form a spring seat 194 opposed to the spring seat 193, and this member is carried by a slidably mounted plunger member 195. The plunger 195 is slidably mounted in a suitable bracket 196 which is carried by the bed plate of the machine and any suitable means may be provided for reciprocating the plunger 195 and its spring seat member 194.

In the present instance, the means for reciprocating the plunger includes a roller 197 which is rotatably mounted as indicated at 198 in the bracket 196. A chain 199 which extends upwardly and over the roller is indicated at 200, the plunger being provided with a groove 201 for receiving the chain. Another chain 202 extends upwardly and over the roller 197 in the direction opposite to that in which the chain 199 extends, and is connected to the plunger as indicated at 203, the plunger being provided with another groove for receiving the latter chain as indicated at 204.

The chain 202 extends downwardly from the roller 197 and is connected at its lower end to the outer end of an arm 205 of a bell crank which is pivotally mounted as indicated at 206 in a bracket 207 provided for that purpose. The other arm of the bell crank just referred to is indicated at 208 and this arm is provided with an anti-friction roll 209 which engages the periphery of a rotating cam 210, the latter being mounted on the main shaft 58 for rotation therewith.

The chain 199 extends downwardly from the pulley 197 and is connected at its lower end to the outer end of an arm 211 of a bell crank which is pivoted as indicated at 212 in the bracket 207. The other arm of the bell crank just mentioned is indicated at 213, this arm being provided with an anti-friction roller 214 which engages the periphery of a cam 215 mounted on the shaft 58 for rotation therewith. The cams 210 and 215 are so shaped that reciprocating motion is imparted to the chains 199 and 202 and the plunger 195. When the cam 215 effects downward movement of the outer end of the arm 211, the plunger 195 and spring seat 194 are moved inwardly to compress a spring against the stationary spring seat 193. During such downward movement of the outer end of the arm 211, the cam 210 permits the arm 205 to move upwardly, the arm being pulled upwardly through the agency of the chain 202. Upon completion of the inward or compressing stroke of the plunger 195, the cam 210 effects downward movement of the outer end of the arm 205 and thereby retracts the plunger 195. The spring seats 193 and 194 are provided with shoulders 216 and 217 respectively for preventing upward escape of the springs, and mechanism which I am about to describe serves to pull the springs downwardly from the sizing mechanism and to feed the same into the nesting or receiving device F.

The spring nesting-receiving mechanism

After the springs have been set or sized, they are fed into a receiving trough wherein they are nested so as to occupy a minimum of space. The mechanism for feeding the springs into the receiving trough and nesting them is best shown in Figs. 1, 2, 6, 16, 17 and 18. The trough is indicated at 220 and may be formed of sheet metal bent to substantially U-shape of a width corresponding to the length of the springs. The trough 220 is connected to the sizing mechanism by means of a pair of elbow conduit portions 221 and 222, the latter being formed of angle iron as clearly shown in Fig. 18. The elbow conduit members are carried by fixed side members 223 and 224 respectively and in conjunction therewith from narrow troughs which receive the respective end coils of the springs as will be readily understood from an inspection of Fig. 18.

When the spring has received its seat, its friction hold against the opposite walls 193 and 194 of the setting mechanism is comparatively light, so that the weight of the spring tends to cause it to move downwardly into the elbow conduits 221 and 222. However, in order to positively feed the springs from the setting mechanism into the conduits 221 and 222 and into the trough 220, I provide cam actuating means for engaging and moving the springs in the desired direction.

For initially moving the springs downwardly from the setting mechanism into the conduits 221 and 222, I provide a feeding device in the form of a hook which includes an elongated bar or stem 225 and a hook or claw 226 at the upper end of the bar 225. The bar 225 is pivotally connected at its lower end to the free end of an arm 227 which is pivoted as indicated at 228 in the bracket 207. Extending from the hub of the arm 227 is another arm 229 which is provided at its outer end with an anti-friction roller 230 adapted to engage the periphery of a rotating cam 231 which is carried by the main shaft 58. The cam 231 is so shaped that it will be effective to rock the arms 227 and 229 and thereby forcibly lower the bar 225 and hook 226. A spring 232 stretched between the arm 227 and a conveniently located stationary part of the machine such as the bed plate 122, serves to raise the hook device when permitted to do so by the cam 231.

In addition to the vertical reciprocating of the hook device, the latter is also rocked horizontally on its pivotal connection with the arm 227. Such horizontal movement is accomplished by means of a cam 233 carried by the shaft 58 which engages an anti-friction roller 234 carried by one end of a guide bar 235. The opposite end of the guide bar 235 is provided with a fixed guide roller 236 and a yieldingly mounted guide roller 237. As clearly shown in Fig. 16, the hook bar 225 passes between the guide rollers 236 and 237 so that horizontal reciprocation of the guide bar 235 incident to the rotation of the cam 233 is transmitted to the hook device. The guide bar 235 is supported for such horizontal reciprocation by means of an arm 238 which is pivotally mounted as indicated at 239 in a bracket 240, the latter being carried by the base plate of the machine. Adjustable stop means indicated at 241 may be provided for limiting rocking movement of the arm 238 in one direction. A spring 242 stretched between the arm 238 and a conveniently located relatively stationary part of the machine serves to normally maintain the guide bar roller 234 in engagement with the cam 233 and to retract the guide bar and hook member from its advanced position.

It will be seen that the combined action of the cams 231 and 233 is to effect both vertical and horizontal reciprocation of the hook device. The horizontal movement is timed with respect to the vertical movement so that outward movement of the hook 226 is effected when the hook is in its extreme raised position so that the hook will project over the spring located between the opposite sides of the setting mechanism. Upon lowering of the hook device, the spring is pulled downwardly into the conduit members 221 and 222 as clearly indicated in Fig. 16. In addition to the hook 226, the bar 225 is provided with an auxiliary hook 243 which is designed to engage such springs as remain in the upper portion of the conduits as shown in Fig. 16. Thus, it will be seen that the springs are positively fed downwardly through the conduits 221 and 222.

The springs are positively fed from the conduits 221 and 222 into the trough 220 by means of a reciprocating feeding device which is in the form of a U-shaped member including side members 244 and 245 and a connecting part 246 (see Fig. 6). The side members 244 and 245 are slidably mounted in ways provided in the side members 223 and 224 respectively and springs such as indicated at 247, stretched between the part 246 by a stationary part of the machine, serve to normally pull the feeding member rearwardly. The feeding member is moved forwardly as an incident to the forward horizontal movement of the bar 225 which engages the back of the connecting member 246 thereby forcing the said member forwardly against the pull of the spring 247. The side members 244 and 245 of the feeding device are provided with teeth such as indicated at 248 and 249 respectively, which are designed to engage in back of the respective end coils of a spring as clearly shown in Fig. 6 so as to force the spring forward when the feeding device is advanced as above explained. For assisting this feeding device to perform its function and to facilitate nesting of the springs, the bar 225 may also be provided with a packer 250. The packer 250 is in the form of a length of strap iron so positioned as to engage an intermediate portion of the springs in the troughs 221 and 222 when the bar 225 is moved forwardly, thereby to force the springs into the desired nested arrangement.

*Driving mechanism for the main shaft 58*

The main shaft 58 of the knotting and setting mechanism may be driven by any suitable means. In this instance, I prefer to drive the same by means of a power take-off from the main power shaft 44 of the spring coiling mechanism. By reference to Figs. 3, 4 and 5, it will be seen that this power take-off is effected by means of a chain 251, preferably of the silent chain type, this chain extending around suitable sprockets, one of which is carried by the main power shaft 44 and the other of which is carried by an auxiliary or countershaft 252. The countershaft 252 is journaled in a bearing bracket 253 which is supported by a drum-like member 254, the latter being rotatably mounted on a boss 255 formed integral with one of the supporting standards 256 which supports the bed plate of the spring knotting and setting mechanism.

The countershaft 252 is provided with a pinion gear 257 which meshes with a gear 258, the latter being keyed or otherwise secured to the shaft 58 so as to effect rotation thereof. As clearly shown in Fig. 4, the gear 258 is located within the drum-like member 254 whereby the latter serves as a guard. The drum 254 and bearing bracket 253 are held against rotary displacement by means of a guide rod 259 which is connected at one end as shown at 260 to the bearing bracket 253. The other end of the tie rod is provided with an adjustable connection 261 with the base of the machine. It will be observed that the normal tendency of the driving chain 251 is to pull the shaft 252 and bracket 253 upwardly around the axis of the main shaft 58. Such tendency is obviously overcome by the tie rod 259. Slack in the chain 251 may obviously be controlled by adjusting the position of the shaft 252 by means of the adjustable connection 261 between the tie rod and base of the machine.

*Summary*

The mechanism above described constitutes a complete and unitary device for making spiral springs, for knotting and tying both ends of the springs, and setting or sizing the springs, and for packaging the same in a nested arrangement for convenience in further handling. It will be observed that from the time the spring is completed in the coil mechanism, the spring is conveyed through various operating mechanisms, the path of travel of the respective springs being substantially straight both horizontally and vertically and comparatively short.

By the arrangement described, the mechanism for performing the various operations is made comparatively simple and compact so that the machine occupies a minimum of space. All of the operations performed by the machine are effected automatically in their proper sequence and it will be understood, of course, that the various actuating mechanisms are so synchronized relative to each other as to carry on the successive operations in properly timed relation. While a new spring is being formed by a coiling machine, one spring is having its first end knotted by the knotter C, another spring is having its second end knotted by the knotter D and another spring is being sized or set by the mechanism E. Thus, there are four distinct operations being carried on simultaneously, each operation being on a different spring.

While the separate operations are being simultaneously performed, the spring conveying mechanism B is being retracted to its initial or starting position in which it is illustrated in Fig. 2. The four operations above referred to are simultaneously completed, whereby the grippers are caused to grip the springs in the first three operating devices, after which the springs are released and the conveying device advanced so as to advance each of the springs to the succeeding stage of operation. When the springs have been so advanced, the two knotters and the sizer take hold of the springs and the grippers are opened up so as to release the spring whereupon the spring conveying mechanism may again return to its initial position.

The structure above described may be varied in many respects without departing from the spirit of my invention, the scope of which should be determined by reference to the following claims, the same being construed as broadly as possible, consistent with the state of the art.

I claim as my invention:

1. In a machine of the class described, the combination of a pair of relatively spaced knotters for tying the ends of a coil spring, means for conveying a spring from one knotter to the other, said knotters being both located on the same side of the path of travel of the spring, and means for reversing the spring so as to present the unknotted end to the second knotter.

2. In a machine of the class described, the combination of a pair of relatively spaced knotters for tying the ends of a coil spring, means for conveying a spring from one knotter to the other in a substantially straight path of travel, said knotters being both located on the same side of the path of travel of the spring, and means for reversing the spring so as to present the unknotted end to the second knotter.

3. In a machine of the class described, the combination of a pair of relatively spaced knotters, means for conveying a spring from one knotter to the other in a substantially straight path of travel, said knotters being both located on the same side of the path of travel of the spring, and means operative as an incident to advancement of the spring for reversing the spring so as to present the unknotted end to the second knotter.

4. In a machine of the class described, the combination of a pair of knotters arranged in spaced relation, and a unitary mechanism for feeding springs to the first knotter and simultaneously reversing and advancing a spring from said first knotter to the second knotter.

5. In a machine for knotting the ends of coil springs, the combination of a pair of relatively spaced knotters, and means for conveying a spring from the first to the second knotter and simultaneously rotating said spring about an axis extending transversely of the spring axis and located within the length of the spring, thereby to present the unknotted spring end to the second knotter, said knotters being both located on the same side of the path of travel of the spring.

6. In a machine for knotting the ends of coil springs, the combination of a pair of relatively spaced knotters, and means for conveying a spring from the first to the second knotter and simultaneously rotating said spring about an axis extending transversely of the spring axis and located within the length of the spring, said means comprising a slidably mounted carriage, means for effecting advancement of said carriage, spring gripping means rotatably mounted on said carriage, and means for effecting rotation of said gripping means.

7. In a machine for knotting the ends of coil springs, the combination of a pair of relatively spaced knotters, and means for conveying a spring from the first to the second knotter and simultaneously rotating said spring about an axis extending transversely of the spring axis and located within the length of the spring, said means comprising a slidably mounted carriage, means for effecting advancement of said carriage, spring gripping means rotatably mounted on said carriage, and means for effecting rotation of said gripping means.

8. In a machine of the class described, the combination of a pair of knotters arranged in spaced relation, and a unitary mechanism for feeding springs to the first knotter and simultaneously reversing and advancing a spring from said first knotter to the second knotter, said means comprising a slidably mounted carriage, means for effecting advancement of said carriage, spring gripping means rotatably mounted on said carriage, and means for effecting rotation of said gripping means.

9. In a machine for knotting the ends of coil springs, the combination of a pair of relatively spaced knotters, and means for conveying a spring from the first to the second knotter and simultaneously rotating said spring about an axis extending transversely of the spring axis and located within the length of the spring, thereby to present the unknotted spring end to the second knotter, said knotters being both located on the same side of the path of travel of the spring, said means comprising a slidably mounted carriage, means for effecting advancement of said carriage, spring gripping means rotatably mounted on said carriage, and means for effecting rotation of said gripping means, comprising a gear connected to said gripper, a rack mounted on a relatively stationary part of the machine, said gear being normally in mesh with said rack and being caused to roll thereon as an incident to the travel of said carriage.

10. In a machine for knotting the ends of coil springs, the combination of a pair of relatively spaced knotters, and means for conveying a spring from the first to the second knotter and simultaneously rotating said spring about an axis extending transversely of the spring axis and located within the length of the spring, thereby to present the unknotted spring end to the second knotter, said knotters being both located on the same side of the path of the spring, said means comprising a slidably mounted carriage, means for effecting advancement of said carriage, spring gripping means rotatably mounted on said carriage, and means for effecting rotation of said gripping means, comprising a gear connected to said gripper, a rack mounted on a relatively stationary part of the machine, said gear being normally in mesh with said rack and being caused to roll thereon as an incident to the travel of said carriage, and means for yieldingly maintaining said rack and gear in mesh whereby disengagement thereof is permitted to occur automatically when sufficient resistance to rotation of said gripper occurs.

11. In a machine of the class described, the combination of a spring coiling mechanism, a pair of relatively spaced spring end knotters arranged for successive operation on springs formed by said coiling mechanism, a spring receiving means adapted to receive the springs subsequent to the last knotting operation, and a unitary mechanism for simultaneously conveying springs from said coiling mechanism and first and second knotters, respectively to said first and second knotters and receiving means.

12. In a machine of the class described, the combination of a plurality of relatively spaced devices arranged in line for successive operation on coil springs, and means for advancing the springs step by step into the zone of operation of the respective devices, said means comprising a movably mounted carriage, a plurality of grippers carried by said carriage, said grippers respectively comprising a pair of jaws mounted for pivotal movement towards and away from each other, actuating means for effecting such pivotal movement of said jaws, rock arms pivotally mounted on said carriage and respectively engaging said actuating members for operating the latter, and means for simultaneously rocking said rock arms comprising levers pivotally mounted on said carriage and respectively connected to said rock arms, and means for simultaneously actuating said levers.

13. In a machine of the class described, the combination of a plurality of relatively spaced devices arranged in line for successive operation on coil springs, and means for advancing said springs successively into the zone of operation of the respective devices, said means comprising a movably mounted carriage, a gripper carried by said carriage and comprising a pair of jaws mounted on said carriage for pivotal movement towards and away from each other, means for effecting such pivotal movement comprising a slidably mounted actuating member, a rock arm pivotally mounted at one end on said carriage and engaging said actuating member at its other end, and means for rocking said rock arm.

14. In a machine of the class described, the combination of a plurality of relatively spaced devices arranged in line for successive operation on coil springs, and means for advancing said springs successively into the zone of operation of the respective devices, said means comprising a movably mounted carriage, a gripper carried by said carriage and comprising a pair of jaws mounted on said carriage for pivotal movement towards and away from each other, means for effecting such pivotal movement comprising a slidably mounted actuating member, a rock arm pivotally mounted at one end on said carriage and engaging said actuating member at its other end, and rotating cam means for rocking said rock arm.

15. In a machine of the class described, the combination of a plurality of relatively spaced devices arranged in line for successive operation on coil springs, and means for advancing said springs successively into the zone of operation of the respective devices, said means comprising a movably mounted carriage, a gripper carried by said carriage and comprising a pair of jaws mounted on said carriage for pivotal movement towards and away from each other, means for effecting such pivotal movement comprising a slidably mounted actuating member, a rock arm pivotally mounted at one end on said carriage and engaging said actuating member at its other end and rotating cam means permanently connected to said rock arm for rocking the same, said cam means being operative when the carriage is in delivery or receiving position and inoperative when the carriage is in movement.

16. In a machine of the class described, the combination of a plurality of relatively spaced devices arranged in line for successive operation on coil springs, and means for advancing springs successively into the zone of operation of the respective devices, said means comprising a movably mounted carriage, a sleeve extending through said carriage and provided with a bearing opening adjacent one end of a smaller diameter than the normal inside diameter of said sleeve, an actuating member extending through said sleeve and slidably mounted in said bearing opening, a collar carried by said actuating member at a point spaced from said sleeve bearing, a spring disposed in said sleeve intermediate said bearing and collar for normally urging the actuating member to move in one direction, means for effecting movement of said actuating member in the opposite direction against the force of said spring, and a pair of jaws pivotally carried by one end of said sleeve and operatively connected to said actuating member so that reciprocation of the latter is effective to cause pivotal movement of said jaws towards and away from each other.

17. In a machine of the class described, the combination of a plurality of relatively spaced devices arranged in line for successive operation on coil springs, and means for advancing springs successively into the zone of operation of the respective devices, said means comprising a movably mounted carriage, a sleeve extending through said carriage and provided with a bifurcated end portion projecting outside of said carriage, a pair of jaws pivotally mounted in said bifurcated sleeve end so as to be pivotally movable towards and away from each other, an internal flange in said sleeve adjacent one end thereof and provided with an opening constituting a bearing opening of smaller diameter than the inside diameter of said sleeve, a jaw actuating member slidably mounted in said bearing opening and provided with a collar fitting inside of said sleeve, a spring disposed around said actuating member, within said sleeve, intermediate said internal flange and collar for normally urging said actuating member to move in one direction, means for effecting movement of said actuating member in the opposite direction, and means for connecting said actuating member and jaws so that reciprocation of the former is effective to impart said pivotal movement to said jaws.

18. In a machine of the class described, the combination of a plurality of relatively spaced devices arranged in line for successive operation on coil springs, and means for advancing springs successively into the zone of operation of the respective devices, said means comprising a movably mounted carriage, a sleeve rotatably mounted in and extending through said carriage and provided with a bifurcated end portion projecting outside of said carriage, a pair of jaws pivotally mounted in said bifurcated sleeve end so as to be pivotally movable towards and away from each other, an internal flange in said sleeve adjacent one end thereof and provided with an opening constituting a bearing opening of smaller diameter than the inside diameter of said sleeve, a jaw actuating member slidably mounted in said bearing opening and provided with a collar fitting inside of said sleeve, a spring disposed around said actuating member, within said sleeve, intermediate said internal flange and collar for normally urging said actuating member to move in one direction, means for effecting movement of said actuating member in the opposite direction, and means for connecting said actuating member and jaws so that reciprocation of the former is effective to impart said pivotal movement to said jaws, and means for effecting rotation of said sleeve whereby said gripper is rotated about the axis of said sleeve to thereby reverse said spring.

19. In a machine of the class described, the combination of a plurality of relatively spaced devices arranged in line for successive operation on coil springs, and means for advancing springs successively into the zone of operation of the respective devices, said means comprising a movably mounted carriage, a sleeve rotatably mounted in and extending through said carriage and provided with a bifurcated end portion projecting outside of said carriage, a pair of jaws pivotally mounted in said bifurcated sleeve end so as to be pivotally movable towards and away from each other, an internal flange in said sleeve adjacent one end thereof and provided with an opening constituting a bearing opening of smaller diameter than the inside diameter of said sleeve, a jaw actuating member slidably mounted in said bearing opening and provided with a collar fitting inside of said sleeve, a spring disposed around said actuating member within said sleeve, intermediate said internal flange and collar for normally urging said actuating member to move in one direction, means for effecting movement of said actuating member in the opposite direction, and means for connecting said actuating member and jaws so that reciprocation of the former is effective to impart said pivotal movement to said jaws, and means for effecting rotation of said sleeve whereby said gripper is rotated about the axis of said sleeve to thereby reverse said spring, comprising a rack mounted on a relatively stationary part of said machine, and a gear member secured to said sleeve and meshing with said rack whereby movement of said carriage causes said gear member to rotate with respect to said rack.

20. In a machine of the class described, the combination of means for receiving and stacking springs, means for conveying the springs to said receiving means, said receiving means including oppositely disposed side parts between which the spring is received and between which normal expansive pressure of the springs tends to frictionally retain the same, and means for advancing the springs in said receptacle comprising an arm having a claw projecting therefrom, means for actuating said arm so as to cause said claw to engage said spring to move the same forward in said receptacle, and means for engaging the advanced springs so as to advance the same independently of the initial spring advancement.

21. In a machine of the class described, the combination of means for receiving and stacking springs, means for conveying the springs to said receiving means, said receiving means including oppositely disposed side parts between which the spring is received and between which normal expansive pressure of the springs tends to frictionally retain the same, and means for advancing the springs in said receptacle comprising an arm having a claw projecting therefrom, means for actuating said arm so as to cause said claw to engage said spring to move the same forward in said receptacle, and means actuated by said arm for engaging the advanced springs so as to advance the same independently of the initial spring advancement.

22. In a machine of the class described, the combination of a receptacle for receiving and stacking springs, means for conveying the springs to said receptacle, said receptacle including oppositely disposed side parts between which the springs are initially received and between which the springs are initially frictionally retained as an incident to the normal expansive pressure thereof, means for advancing the springs from their initial position in said receptacle comprising an elongated arm having a claw projecting laterally therefrom, means for moving said arm longitudinally, means for moving said arm laterally in predetermined timed relation to said longitudinal movement so as to cause said claw to engage said spring for effecting said advancement.

23. In a machine of the class described, the combination of means for supplying coil springs, a pair of relatively spaced knotters for simultaneously tying the ends of a pair of springs, means for conveying springs successively to said knotters, each of said knotters comprising means for receiving and positioning the end coil of a spring, means for clamping said coil adjacent the end thereof, and a knotting pinion, said clamping means being adjustable to carry said spring into the bight of said pinion and to incidentally effect initial bending of the end of the spring, means for effecting simultaneous adjustment of the clamping means of both of said knotters, and means for effecting simultaneous operation of said knotting pinions.

JOHN F. GAIL.